United States Patent
Ehrenberg et al.

(10) Patent No.: US 6,809,187 B2
(45) Date of Patent: Oct. 26, 2004

(54) METAL COMPLEX DYES BASED ON BUCHERER NAPHTHOLS

(75) Inventors: Stefan Ehrenberg, Frankfurt am Main (DE); Klaus Kunde, Neunkirchen (DE)

(73) Assignee: Oystar Textil Farben GmbH & Co. (DE)

( * ) Notice: Subject to any disclaimer, the term of this patent is extended or adjusted under 35 U.S.C. 154(b) by 29 days.

(21) Appl. No.: 10/399,012

(22) PCT Filed: Oct. 6, 2001

(86) PCT No.: PCT/EP01/11542
§ 371 (c)(1),
(2), (4) Date: Apr. 10, 2003

(87) PCT Pub. No.: WO02/33006
PCT Pub. Date: Apr. 25, 2002

(65) Prior Publication Data
US 2004/0054154 A1 Mar. 18, 2004

(51) Int. Cl.[7] .............. C09B 62/012; C09B 62/095; C09B 62/255; C09B 62/515; D06P 1/38
(52) U.S. Cl. .............. 534/622; 534/624; 534/629; 534/634; 534/638; 534/642; 8/549
(58) Field of Search .............. 534/622, 624, 534/629, 634, 638, 642; 8/549

(56) References Cited

U.S. PATENT DOCUMENTS 3,562,246 A  2/1971  Barwick, III et al. ....... 260/148
4,152,324 A  5/1979  McCrae et al. ............. 260/151

FOREIGN PATENT DOCUMENTS

| DE | 1 101 659 | 3/1961 |
|----|-----------|--------|
| DE | 2 444 883 | 4/1975 |
| GB | 961 552   | 6/1964 |
| GB | 973 238   | 10/1964 |

*Primary Examiner*—Fiona T. Powers
(74) *Attorney, Agent, or Firm*—Connolly Bove Lodge & Hutz LLP

(57) ABSTRACT

Reactive copper, cobalt or chromium complex compounds of the general formula (1)

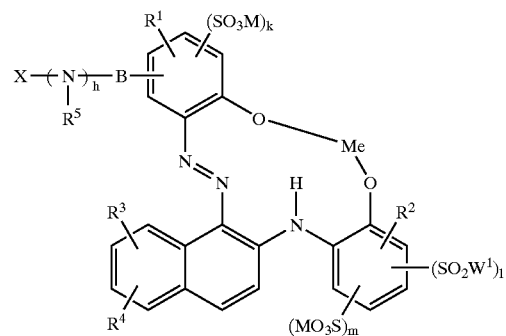

where $R^1$–$R^5$, M, Me, $W^1$, X, k, l and m are each as defined in claim 1, processes for their preparation and their use for dyeing or printing textile fiber materials.

21 Claims, No Drawings

METAL COMPLEX DYES BASED ON BUCHERER NAPHTHOLS

RELATED APPLICATIONS

This application is a Rule 1.137 application of PCT application No. PCT/EP01/11542 filed Oct. 6, 2001 which claims benefit to German application no. 100 51 018.3 filed Oct. 14, 2000.

DESCRIPTION

The present invention relates to novel reactive dyes, processes for their preparation and their use for dyeing or printing textile fiber materials.

Reactive dyes for dyeing or printing hydroxyl- and/or carboxamido-containing materials these days must combine good general fastness properties with good washoff of the unfixed portions. Given the dyes available at present, there is accordingly room for improvement.

It is an object of the present invention to provide novel, improved reactive dyes for the dyeing and printing of hydroxyl- and/or carboxamido-containing materials, especially fiber materials, that combine good general fastness properties, especially a high lightfastness, with good washoff of the unfixed portions.

This object is surprisingly achieved by the hereinbelow described dyes according to the invention.

The present invention accordingly provides reactive copper, cobalt or chromium complex compounds of the general formula (1)

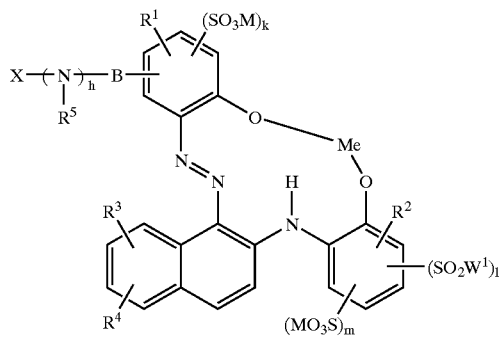

(1)

where
B is a direct bond or a bridge member;
X is a fiber-reactive structural element;
$W^1$ is vinyl or a group of the formula —$CH_2$—$CH_2$—V, where V is an alkali-eliminable radical;
$R^1$, $R^2$ are independently hydrogen, chlorine, alkyl of 1–4 carbon atoms, such as methyl, ethyl, n-propyl, i-propyl, n-butyl, i-butyl, tert-butyl, alkoxy of 1–4 carbon atoms, such as methoxy, ethoxy, n-propyloxy, i-propyloxy, carboxyl or sulfamoyl, hydrogen, hydroxyl or sulfo, preferably hydrogen;
$R^3$ is hydrogen, hydroxyl, carboxyl or sulfo;
$R^4$ is hydrogen or sulfo;
$R^5$ is hydrogen, alkyl of 1 to 4 carbon atoms which can be substituted by halogen, hydroxyl, cyano, alkoxy of 1 to 4 carbon atoms, alkoxycarbonyl of 2 to 5 carbon atoms, carboxyl, sulfo or sulfato;
h, k, l, m are independently 0 or 1;
Me is copper, cobalt or chromium, preferably copper and cobalt and particularly preferably copper;

M is hydrogen or an alkali metal, such as sodium, potassium or lithium, or the mole equivalent of an alkaline earth metal, such as calcium, and preferably is hydrogen or an alkali metal.

Suitable fiber-reactive radicals X, i.e., those which react with the OH or NH groups of the fiber under dyeing conditions to form covalent bonds, are for example —$SO_2$CH=$CH_2$ or —$SO_2CH_2CH_2$V, where a V grouping, which can be eliminated through the action of alkali, represents in particular radicals of the formula —$OSO_3M$, thiosulfato of the formula —$SSO_3M$, acetyloxy of the formula —$OCOCH_3$, phosphato of the formula —$OPO(OM)_2$ and chloro, bromo, benzyloxy of the formula —$OCOC_6H_5$, phenylsulfonyloxy of the formula —$SO_2$—$C_6H_5$ or pyridinium, which may be substituted, for example by alkyl of 1–4 carbon atoms, carboxyl, sulfo, cyano or carbamoyl, where M is as defined above, or are fiber-reactive radicals X, especially those which contain at least one reactive substituent attached to a 5- or 6-membered aromatic heterocyclic ring, for example to a monoazine, diazine or triazine ring, especially a pyridine, pyrimidine, pyridazine, pyrazine, thiazine, oxazine or asymmetrical or symmetrical triazine ring, or to such a ring system that comprises one or more fused-on aromatic carbocyclic rings, for example a quinoline, phthalazine, cinnoline, quinazoline, quinoxaline, acridine, phenazine or phenanthridine ring system.

Fiber-reactive radicals selected from the pyrimidines or triazines are particularly suitable.

Examples of reactive substituents on the heterocycle include halogen (Cl, Br or F), ammonium including hydrazinium, pyridinium, picolinium, carboxypyridinium, sulfonium, sulfonyl, azido(N3), thiocyanato, sulfinic acid and sulfonic acid.

X can accordingly be in particular

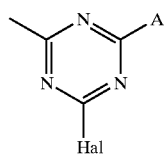

where
Hal=Cl, F and
A is the radical of an amine AH which may be unsubstituted or substituted by one or two $C_1$–$C_6$ alkyl groups, which may independently be substituted by hydroxyl, $C_1$–$C_2$ alkoxy groups, sulfato, phenyl or hydroxycarbonyl, or by a phenyl radical which is unsubstituted or substituted by one or two substituents selected from the group consisting of $C_1$–$C_2$-alkyl, $C_1$–$C_2$-alkoxy, $C_1$–$C_2$-alkoxyalkyl, $C_1$–$C_2$-alkoxyalkoxy, amino, hydroxyl, chlorine, sulfo, sulfomethyl, sulfonamide, carboxyl, carboxamide, carboxylic ester, nitrile, aminocarboxamide and oxalamino or by a naphthyl radical which is unsubstituted or substituted by one, two or three sulfo groups or is taurine, N-methyltaurine, methylaminomethanesulfonic acid, pyrrolidine, piperidine, 1-methylpiperazine, morpholine.

Preferred compounds AH include for example ammonia, methylamine, ethylamine, n-propanolamine, isopropanolamine, n-butylamine, isobutylamine, tert-butylamine, n-pentylamine, n-hexylamine, cyclohexylamine, dimethylamine, diethylamine, di-n-propylamine, diisopropylamine, methylethylamine, ethanolamine, diethanolamine, 2-methoxyethylamine, 2-ethoxyethylamine, sulfatoethylamine, aminoacetic acid, N-methylaminoacetic acid, taurine, N-methyltaurine, methylaminomethanesulfonic acid, pyrrolidine, piperidine, 1-methylpiperazine, cyanamide, morpholin, benzylamine, β-phenylethylamine, N-methylbenzylamine, dibenzylamine, aniline, 1-amino-2-, 3- or 4-methylbenzene, 1-amino-3,4- or 3,5-dimethylbenzene, 1-amino-2-, 3- or 4-ethylbenzene, 1-amino-2-, 3- or 4-methoxybenzene, 1-amino-4-ethoxybenzene, 1-amino-2-, 3- or 4-(2-hydroxyethoxy)benzene, 1-amino-2-, 3- or 4-(2-methoxyethoxy)benzene, 1-amino-2-, 3- or 4-chlorobenzene, 2-, 3- or 4-aminophenylmethanesulfonic acid, 2-aminobenzenesulfonic acid, 3-aminobenzenesulfonic acid, 4-aminobenzene-sulfonic acid, 5-aminobenzene-1,3- or 1,4-disulfonic acid, 4-aminobenzene-1,2- or 1,3-disulfonic acid, 2-, 3- or 4-aminobenzenesulfonamide, 2-, 3- or 4-aminobenzene-N-methylsulfonamide, 2-, 3- or 4-aminobenzene-N-dimethylsulfonamide, 2-, 3- or 4-aminobenzene-N-(2-hydroxyethyl)sulfonamide, 5-aminobenzene-1,3-dicarboxylic acid, 2-, 3- or 4-aminobenzoic acid, 2-, 3- or 4-aminobenzamide, methyl or ethyl 2-, 3- or 4-aminobenzoate, 2-, 3- or 4-aminobenzonitrile, 3-amino-(N-phenylsulfonyl)benzenesulfonamide, 2-, 3- or 4-aminophenol, 5-amino-2-hydroxybenzenesulfonic acid, 4-amino-2-hydroxybenzenesulfonic acid, 5-amino-2-ethoxybenzenesulfonic acid, 1-acetylamino-2- or 4-aminobenzene, 1-amino-3- or 4-(hydroxyacetyl)aminobenzene, 1-amino-4-(sulfoacetyl)aminobenzene, 3- or 4-aminophenylurea, N-(3-aminophenyl)-N'-(2-hydroxyethyl)urea, 3- or 4-aminophenyloxamic acid, 1-methylamino-3- or -4-methylbenzene, 1-ethylamino-4-chlorobenzene, 2-amino-5-methoxybenzenesulfonic acid, 3-amino-4-methoxy-benzenesulfonic acid, 1-ethylamino-3- or -4-methylbenzene, N-(2-hydroxyethyl)-aniline, 1-(2-hydroxyethyl)amino-3-methylbenzene, 3- or 4-methylaminobenzoic acid, 4-methylaminobenzenesulfonic acid, 5-amino-2-oxalaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2-sulfonic acid, 6-aminonaphthalene-2-sulfonic acid, 7-aminonaphthalene-2-sulfonic acid, 7-methylaminonaphthalene-2-sulfonic acid, 7-butylaminonaphthalene-2-sulfonic acid, 7-isobutyl-aminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 8-aminonaphthalene-1,3,5-trisulfonic acid, 4-aminonaphthalene-1,3,6-trisulfonic acid, 7-aminonaphthalene-1,3,6-trisulfonic acid, 8-amino-naphthalene-1,3,6-trisulfonic acid, 4-aminonaphthalene-1,3,7-trisulfonic acid.

The X radical is further preferably a halotriazinyl radical which can be bonded to a second halotriazinyl radical or to a halodiazinyl radical or to one or more vinylsulfonyl or sulfatoethylsulfonyl radicals directly or via a bridge member of the formulae

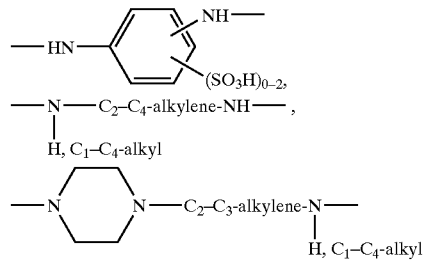

or in the case of sulfatoethylsulfonyl or vinylsulfonyl group via a bridge member

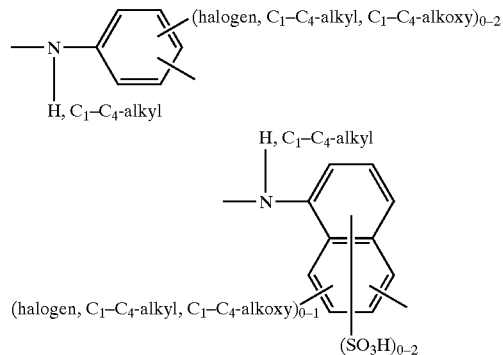

where the alkyl radicals may in turn be substituted by $SO_3H$, COOH, OH, $OSO_3H$ radicals.

Examples of such X radicals are:

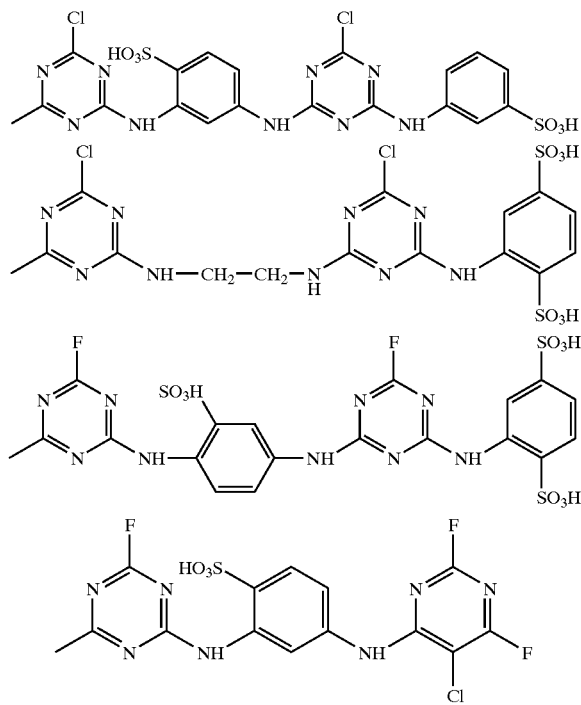

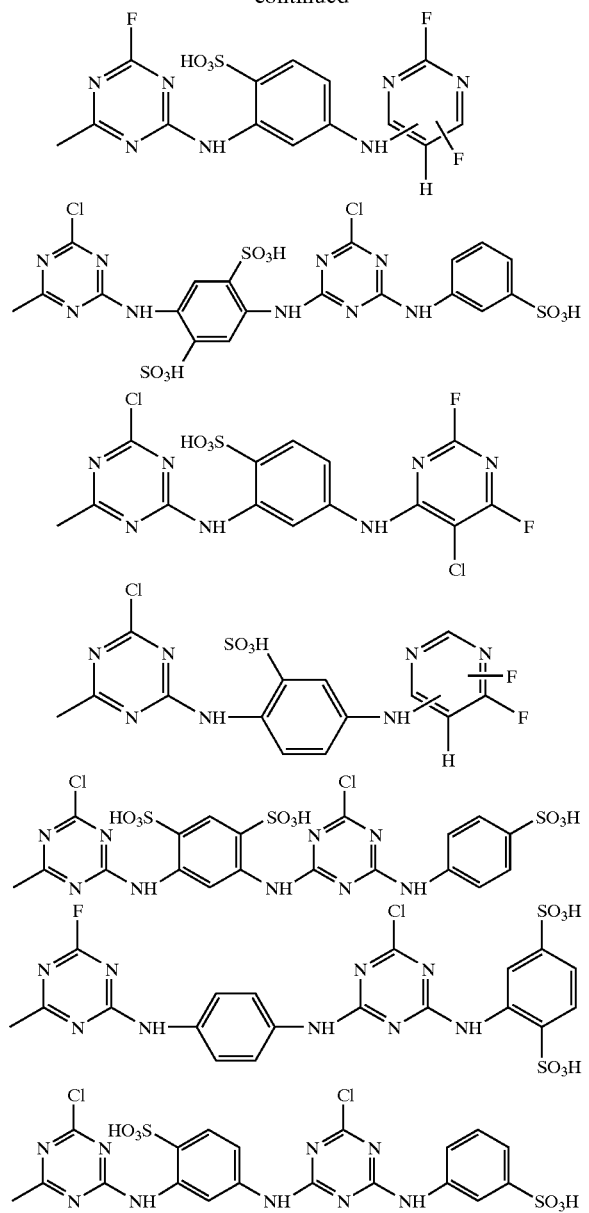

Further examples of X are:
2,4-dichloro-1,3,5-triazin-6-yl, 2,4-dichloropyrimidin-6-yl, 2,4,5-trichloropyrimidin-6-yl, 2,4-dichloro-5-nitro- or -5-methyl or -5-carboxymethyl- or -5-carboxy- or -5-cyano- or -5-vinyl- or -5-sulfo- or -5-mono-, -di- or -trichloromethyl- or -5-carbalkoxypyrimidin-6-yl, 2,6-dichloropyrimidine-4-carbonyl, 2,4-dichloro-pyrimidine-5-carbonyl, 2-chloro-4-methylpyrimidine-5-carbonyl, 2-methyl-4-chloro-pyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloro-pyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloro-quinoxaline-5 or -6-carbonyl, 2,3-dichloroquinoxaline-5- or -6-sulfonyl, 1,4-dichlorophthalazine-6-sulfonyl or -6-carbonyl, 2,4-dichloroquinazoline-7- or -6-sulfonyl or -carbonyl, 2- or 3- or 4-(4',5'-dichloropyridaz-6'-on-1'-yl)-phenylsulfonyl or -carbonyl, β-(4',5'-dichloropyridaz-6'-on-1'-yl) ethylcarbonyl, N-methyl-N-(2,3-dichloroquinoxaline-6-sulfonyl)aminoacetyl, N-methyl-N-(2,3-dichloroquinoxaline-6-carbonyl)aminoacetyl, and the corresponding bromine and fluorine derivatives of the abovementioned chlorine-substituted heterocyclic radicals, and among these, for example, 2-fluoro-4-pyrimidinyl, 2,6-difluoro-4-pyrimidinyl, 2,6-difluoro-5-chloro-4-pyrimidinyl, 4,6-difluro-2-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluoro-dichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulfonylpyrimidin-6-yl, 2,6-difluoro-5-methyl-sulfonyl-4-pyrimidinyl, 2,6-dichloro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; triazine radicals containing sulfonyl groups, such as 2,4-bis-(phenylsulfonyl)-triazin-6-yl, 2-(3'-carboxyphenyl)sulfonyl-4-chlorotriazin-6-yl, 2-(3'-sulfophenyl)sulfonyl-4-chlorotriazin-6-yl, 2,4-bis(3'-carboxyphenylsulfonyl)triazin-6-yl; pyrimidine radicals containing sulfonyl groups, such as 2-carboxymethylsulfonylpyrimidin-4-yl, 2-methylsulfonyl-6-methyl-pyrimidin-4-yl, 2-methylsulfonyl-6-ethyl-pyrimidin-4-yl, 2-phenylsulfonyl-5-chloro-6-methyl-pyrimidin-4-yl, 2,6-bis-methylsulfonyl-pyrimidin-4-yl, 2,6-bis-methylsulfonyl-5-chloro-pyrimidin-4-yl, 2,4-bis-methylsulfonyl-pyrimidine-5-sulfonyl, 2-methylsulfonyl-pyrimidin-4-yl, 2-phenylsulfonylpyrimidin-4-yl, 2-trichloromethylsulfonyl-6-methyl-pyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methylpyrimidin-5-sulfonyl, 2-methylsulfonyl-5-nitro-6-methylpyrimidin-4-yl, 2,5,6-tris-methylsulfonylpyrimidin-4-yl, 2-methylsulfonyl-5,6-dimethylpyrimidin4-yl, 2-ethylsulfonyl-5-chloro-6-methylpyrimidin-4-yl, 2-methylsulfonyl-6-chloro-pyrimidin-4-yl, 2,6- bismethylsulfonyl-5-chloropyrimidin-4-yl, 2-methylsulfonyl-6-carboxypyrimidin-4-yl, 2-methylsulfonyl-5-sulfopyrimidin-4-yl, 2-methylsulfonyl-6-carbomethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-β-sulfoethylsulfonyl-6-methylpyrimidin-4-yl, 2-methylsulfonyl-5-bromopyrimidin-4-yl, 2-phenylsulfonyl-5-chloropyrimidin-4-yl, 2-methylsulfonyl-6-chloro-pyrimidine-4- and -5-carbonyl, 2,6-bis(methylsulfonyl)pyrimidine-4- or -5-carbonyl, 2-ethylsulfonyl-6-chloropyrimidine-5-carbonyl, 2,4-bis(methylsulfonyl)pyrimidine-5-sulfonyl, 2-methylsulfonyl-4-chloro-6-methylpyrimidine-5-sulfonyl or -carbonyl; 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, such as 2-methyl-sulfonyl- or 2-ethylsulfonylbenzothiazole-5- or -6-sulfonyl or carbonyl, 2-phenyl-sulfonylbenzothiazole-5- or -6-sulfonyl or -carbonyl and the corresponding 2-sulfonylbenzothiazole-5- or -6-carbonyl or -sulfonyl derivatives containing sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl and the N-oxide of 4-chloro- or 4-nitroquinoline-5-carbonyl.

X is particularly preferably

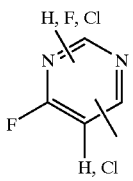

Useful bridge members B include for example those of the general formulae (a) to (m)

*—N—Alk— (a)
    |
    R

*—CO—N—Alk— (b)
       |
       R

*—SO₂—N—Alk— (c)
        |
        R

*—O—Alk— (d)

*—N—CO—Alk— (e)
    |
    R

*—CO—N—Ar— (f)
       |
       R

*—SO₂—N—Ar— (g)
        |
        R

*—CO—Alk (h)

—Alk— (i)

*—SO₂—Alk— (j)

*—N—CO—Ar— (k)
    |
    R

*—Alk—Ar— (l)

—N—CO—N—Alk— (m)
  |      |
  R      R where the asterisk marks the site of attachment to the chromophore;

R is hydrogen or alkyl of 1 to 6 carbon atoms, preferably alkyl of 1 to 4 carbon atoms, such as ethyl and methyl, which may be substituted, for example by substituents selected from the group consisting of halogen, hydroxyl, carboxyl, sulfo and sulfato, and it preferably is methyl and ethyl and especially hydrogen;

Alk is alkylene of 1 to 6 carbon atoms or alkylene of 2 to 8, preferably of 2 to 6 carbon atoms, which is interrupted by 1 or 2 hetero groups, such as NH, N, O or S, or by 1 or 2 groupings containing 1, 2 or 3 hetero groups;

Ar is phenylene or naphthylene or the radical of a biphenyl or stilbene, each of which of these Ar radicals may be substituted, for example by substituents selected from the group consisting of fluorine, chlorine, bromine, alkyl of 1 to 4 carbon atoms, alkoxy of 1 to 4 carbon atoms, carboxyl and sulfo.

Reactive dyes of the general formula (1) according to the invention may have the same chromophore but differ with regard to the fiber-reactive groups $W^1$. More particularly, in the case of the same chromophore, —SO₂W¹ can be firstly —SO₂CH=CH₂ and secondly —SO₂CH₂CH₂V, particularly preferably β-sulfato-ethylsulfonyl. The fraction of the dye in the vinylsulfonyl form can be up to about 30 mol %, based on the respective dye chromophore. Preferably the fraction of vinylsulfonyl dye to β-ethyl-substituted dye is in a molar ratio between 5:95 and 30:70.

The individual symbols in the hereinabove indicated general formulae and in the general formulae hereinbelow, whether of different or identical designation within any one general formula, may have identical or different meanings under their definition.

Preferred reactive dyes of the general formula (1) according to the invention are those of the general formula (1-1)

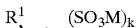

where
x is —SO₂CH=CH₂ or —SO₂CH₂CH₂V and
V, $R^1$, $R^2$, $R^3$, $R^4$, $W^1$, M, Me, k, l, m are each as defined above.

Particularly preferred reactive dyes according to the invention are those of the general formulae (1-1a) and (1-1b)

(1-1a)

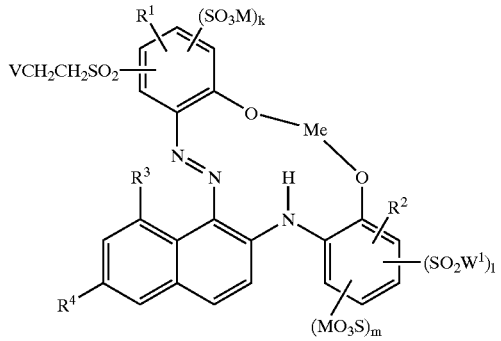

(1-1b)

where k, l, m, W$^1$, V, Me and M are each as defined above,
R$^3$ is hydroxyl,
R$^4$ is sulfo and
R$^1$ and R$^2$ are each hydrogen.

Very particularly preferred reactive dyes of the general formula (1) according to the invention are those wherein X is a radical of the formula (2)

(2)

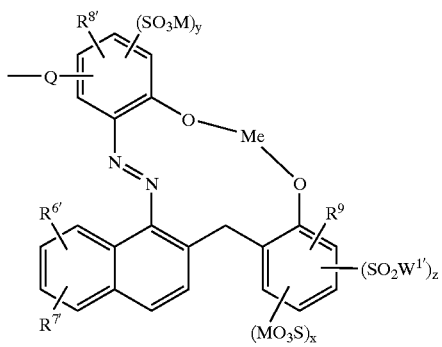

and Q is

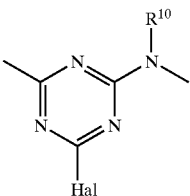

or

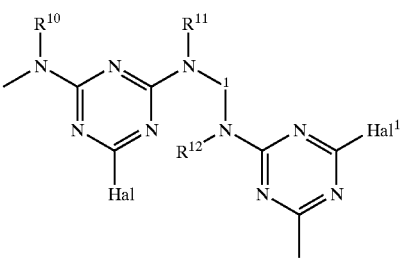

and
W$^{1'}$ is W$^1$,
R$^{6'}$ is hydrogen, hydroxyl or sulfo,
R$^{7'}$ is hydrogen or sulfo,
x,y,z are each 0 or 1,
h is 1 and
R$^{8'}$, R$^{9'}$ are independently hydrogen, chlorine, alkyl of 1–4 carbon atoms, such as methyl, ethyl, n-propyl, i-propyl, n-butyl, i-butyl, tert-butyl, alkoxy of 1–4 carbon atoms, such as methoxy, ethoxy, n-propyloxy, i-propyloxy, carboxyl or sulfamoyl, sulfo, preferably hydrogen;
R$^A$, R$^{10}$, R$^{11}$, R$^{12}$ are independently hydrogen, substituted or unsubstituted alkyl of 1–4 carbon atoms, preferred substituents being halogen, hydroxyl, carboxyl, sulfo or sulfato;
B$^1$ is in particular 1,2-ethylene, 1,3-propylene, 1,4-butylene, 1,2-propylene, 1,3-butylene, straight-chain alkylene of 2 to 6 carbon atoms and branched alkylene of 3 to 6 carbon atoms which are each interrupted by 1 or 2 hetero groups selected from the groups of the formulae —O—, —CO—, —SO$_2$—, —NH—, —N(R$^A$)—, —NH—CO—, —CO—NH—, —SO$_2$—NH— and —NH—SO$_2$—, phenylene, which may be substituted by 1 or 2 substituents selected from the group consisting of sulfo, carboxyl, methyl, ethyl, methoxy and ethoxy, for example phen-1,3-ylene, phen-1,4-ylene, 6-sulfophen-1,3-ylene, 6-sulfophen-1,4-ylene, 3,6-disulfophen-1,4-ylene, 6-methoxyphen-1,3-ylene or benzylidene, which may be substituted by 1 or 2 substituents selected from the group consisting of sulfo, carboxyl, methyl, ethyl, methoxy and ethoxy, for example 1,4-benzylidene, 1,3-benzylidene, 2-sulfophen-1 yl-4-methylene, and 2-methoxyphen-1-yl-4-methylene, also the radical of 1,1-diphen-4,4'-ylene which may be substituted in each phenylene radical by methyl, methoxy or sulfo, or is the 1,1'-stilben-4,4'-ylene radical which may be substituted in every phenylene radical by methyl, methoxy or sulfo, or is cycloalkylene of 5 to 8 carbon atoms, or is a group of the general formula alk-B$^3$, B$^3$-alk, alk-B$^3$-alk or phen-G-phen, in each of which alk is alkylene of 2 to 4 carbon atoms, such as 1,2-ethylene, 1,3-propylene and 1,4-butylene, or is alkylene of 2 to 10 carbon atoms, preferably of 4 to 6 carbon atoms, which is interrupted by 1 or 2, preferably one, hetero groups selected from the group consisting of —O— and —NH—, is B$^3$-phenylene, which may be substituted by 1 or 2 substituents selected from the group consisting of sulfo, carboxyl, methyl, ethoxy, methoxy, ethoxy, chlorine and bromine, or is cycloalkylene of 5 to 8 carbon atoms or is the bivalent radical of a saturated 5- to 8-membered heterocycle which contains two nitrogen atoms, for example the 1,4-piperazinylene radical bonded by one or both nitrogen atoms to the alk radicals or to alk and a carbon atom of the triazine radical, phen is a phenylene radical which may be substituted by 1 or 2 substituents selected from the group consisting of carboxyl, sulfo, methyl, ethyl, methoxy, ethoxy, chlorine and bromine, and G is a direct bond or a radical of the formula —CH═CH— or is cycloalkylene of 5 to 8 carbon atoms, such as cyclohexylene, or the group —N($R^{12}$)—$B^1$—N($R^{11}$)— is the bivalent radical of a saturated 5- to 8-membered heterocycle which contains the two nitrogen atoms and whose nitrogen atoms are bonded to a carbon atom of the triazine radical, or is N-(2-aminoethyl)piperazine;

Hal, $Hal^1$ are independently chlorine, fluorine or a substituted or unsubstituted pyridinium radical.

Very particular preference is given to dyes of the formula (1) according to the invention
wherein X is a grouping of the following formula:

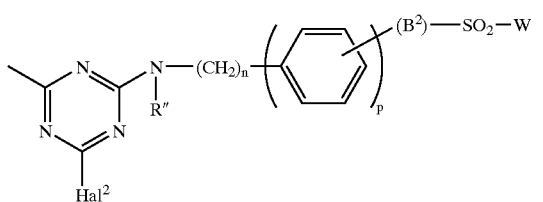

where
W is $W^1$;
n is from 0 to 3;
p is 0 or 1;
$B^2$ is a grouping of the formula —$(CH_2)^s$—$((CH_2)_2$—O—$(CH_2)_2)_t$;
S is from 0 to 6;
T is 0 or 1;
$Hal^2$ is Cl, F and
R" is phenyl, hydrogen or alkyl of 1 to 6 carbon atoms, preferably alkyl of 1 to 4 carbon atoms, such as ethyl and methyl, which may be substituted, for example by substituents selected from the group consisting of halogen, hydroxyl, carboxyl, sulfo and sulfato, and it preferably is methyl or ethyl or especially hydrogen, or
R" is phenyl and n=0; p=0; s=2 or 3; t=0 or
R" is H and n=0; p=1; s=1, t=0 where the phenyl ring between

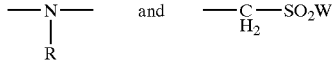

is metasubstituted, or
R" is H; n=0; p=0; s=3; t=0 or
R" is methyl; n=0; p=0; s=2; t=0 or
R" is H; n=0; p=1; s=0, t=0 where the phenylene ring between

and —$SO_2W$ is ortho, meta or parasubstituted, or
R" is H; n=0; p=0; s=0; t=1 or
R" is H; n=2; p=0; s=0; t=0.

Very particular preference is further given to dyes of the general formula (1) wherein B is as defined for the general formulae (b), (c), (e), (f), (g), (k), and (m), h is 0 and X is $SO_2W^1$.

Preferred radicals

X—(N—$R_5$)$_h$—B— where h=0 include for example

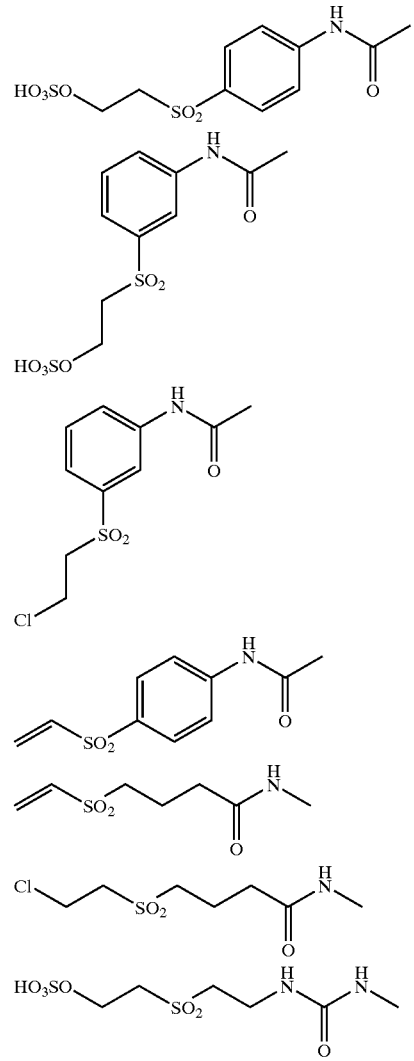

The reactive dyes of the general formula (1) according to the invention are generally present as a preparation in solid or liquid (dissolved) form. In solid form, they generally contain the electrolyte salts customary in the case of water-soluble and especially fiber-reactive dyes, such as sodium chloride, potassium chloride and sodium sulfate, and can further contain the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, or small amounts of siccatives or, if they are present in a liquid, aqueous solution (including the presence of thickeners of the type customary in print pastes), they may also include substances which ensure a long life for these preparations, for example mold preventatives.

The reactive dyes of the general formula (1) according to the invention are preferably present as a dye powder or as a granular dye containing 10 to 80% by weight, based on the powder or granules, of an electrolyte salt which is also known as a standardizing agent. Granules have particle sizes of 50 to 500 μm in particular. These solid preparations can further contain the aforementioned buffer substances in a total amount of up to 10% by weight, based on the preparation. When the dyes are present in aqueous solution, the total dye content in these aqueous solutions is up to about 50% by weight, for example between 5 and 50% by weight, and the electrolyte salt content in these aqueous solutions is preferably below 10% by weight, based on the aqueous solution. The aqueous solutions (liquid preparations) can contain the aforementioned buffer substances generally in an amount of up to 10% by weight, preferably up to 2% by weight.

The present invention further provides processes for preparing the reactive dyes of the general formula (1) according to the invention.

For example, the dyes of the general formula (1-1) according to the invention are obtainable from amino compounds of the general formula (1-2)

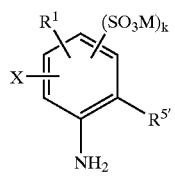

(1-2)

where
$R^{5'}$ is hydrogen, methoxy or hydroxyl,
X is $SO_2$—$W^1$ or $SO_2CH$=$CH_2$ or $SO_2CH_2CHV$, where V is as defined above, and
M, $R^1$, and k are each as defined above, by diazotization and coupling onto a compound of the formula (1-3)

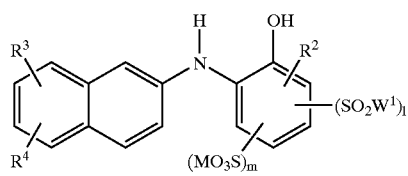

(1-3)

where $R^2$, $R^3$, $R^4$, $W^1$, l and m are each as defined above, at a temperature between 0° C. and 50° C., preferably between 10° C. and 40° C., and at a pH of less than 6, preferably between 0.5 and 4.0, and subsequent reaction with copper, cobalt or chromium donors similarly to known processes for synthesizing metal complexes.

Amines of the general formula (1-2) used as diazo components in the process of the invention are for example 3- or 4-(β-sulfatoethylsulfonyl)aniline, 2-amino-4-(β-sulfatoethylsulfonyl)anisole, 2-amino-5-(β-sulfatoethylsulfonyl)anisole, 2-methoxy-5-methyl-4-(β-sulfatoethylsulfonyl)aniline, 2,5-dimethoxy-4-(β-sulfatoethylsulfonyl)aniline, 2,4-dimethoxy-5-(β-sulfatoethylsulfonyl)aniline, 4-amino-3-(β-sulfatoethylsulfonyl)anisole, 4-amino-3-(β-sulfatoethylsulfonyl) toluene, 4-(β-sulfatoethylsulfonyl) aniline-2-sulfonic acid, 2-chloro- or 2-bromo-4-(β-sulfatoethylsulfonyl)aniline, 2-amino-4- or -5-(β-sulfatoethylsulfonyl)phenol, 6-chloro-, 6-bromo- or 6-nitro-4-(β-sulfatoethylsulfonyl)phenol, 2-amino-4-(β-sulfatoethylsulfonyl)phenol-6-sulfonic acid, 2-amino-4-methyl-5-(β-sulfato-ethylsulfonyl)phanol, 2-amino-4-methoxy-5-(β-sulfatoethylsulfonyl)phenol and their corresponding vinylsulfonyl, β-thiosulfatoethylsulfonyl and β-chloroethyl-sulfonyl compounds.

The coupling components of the general formula (1-3) according to the invention are preferably prepared by Bucherer reaction of the corresponding naphthols or naphthylamines with 2-aminophenols of the general formula (1-5)

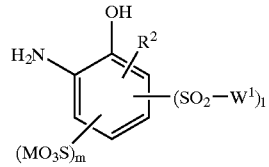

(1-5)

where M, $R^2$, $W^1$, m and l are each as defined above.

The conditions of the Bucherer reaction are known per se, for example from GB-A-230 457 and CS 155758; it is preferably carried out in water at 80° C. and 130° C., particularly preferably between 100° C. and 130° C.

Starting compounds for the Bucherer reaction are for example 1-hydroxy-7-aminonaphthalene-3-sulfonic acid, 1,7-dihydroxynaphthalene-3-sulfonic acid, 2-aminonaphthalene-6-sulfonic acid, 2-aminonaphthalene-5-sulfonic acid, 2-hydroxynaphthalene-6-sulfonic acid, 2-hydroxynaphthalene-5-sulfonic acid, 1,6-dihydroxynaphthalene-3-sulfonic acid, 2-hydroxynaphthalene-7-sulfonic acid, 2-aminonaphthalene-7-sulfonic acid, 1-hydroxy-6-aminonaphthalene-3-sulfonic acid, 2-aminonaphthalene-5,7-disulfonic acid, 2-hydroxynaphthalene-5,7-di-sulfonic acid and 2-aminophenol, 2-aminophenol-4-sulfonic acid, 2-aminophenol-6-sulfonic acid, 2-amino-4-methylphenol, 3-amino-4-hydroxybenzoic acid, 3-amino-4-hydroxybenzoic acid, 3-amino-2-hydroxybenzoic acid, 4-amino-3-hydroxybenzoic acid, 2-amino-4-(β-sulfatoethylsulfonyl) phenol, 2-amino-4-(β-hydroxyethylsulfonyl)phenol-6-sulfonic acid.

In a preferred embodiment of the preparative process, the Bucherer reaction was carried out using aminophenol of the general formula (1-5) where $W^2$ is hydroxyethyl and l is 1. For instance, a compound of the general formula (1-4)

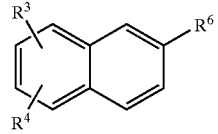

(1-4)

where $R^3$ and $R^4$ are each as defined above and $R^6$ is hydroxyl or amino, is adjusted to a pH of 5.7 in water and 39% sodium hydrogensulfite solution using 33% aqueous sodium hydroxide solution together with a compound of the general formula (1-5)

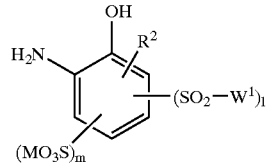

(1-5)

where M, $R^2$, $W^1$, m and l are each as defined above. If appropriate, the addition of sodium chloride is followed by refluxing the reaction mixture at 100° C. to 110° C. for 20 hours. After cooling to room temperature, the product of the formula (1-3)

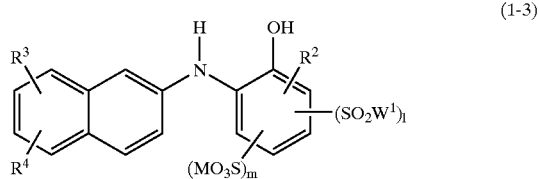

(1-3)

where $R^2$, $R^3$, $R^4$ and m are each as defined above, $W^1$ is hydroxyethyl and l is 1, is isolated, washed with saturated sodium chloride solution and dried.

The resultant compound of the general formula (1-3) where $W^1$ is hydroxyethyl and l and m are each 1 is subsequently converted by customary methods, for example using anhydrous sulfuric acid as described in EP-A-0568876, into the corresponding sulfuric ester, i.e., into a compound of the general formula (1-3) where $W^1$ is β-sulfatoethyl.

The diazotization of the compounds of the general formula (1-2) and also the coupling reaction with the compound of the general formula (1-3) are known per se to one skilled in the art and can be carried out in the generally customary manner extensively described in the pertinent literature.

The thus obtainable monoazo compounds of the general formula (1-6)

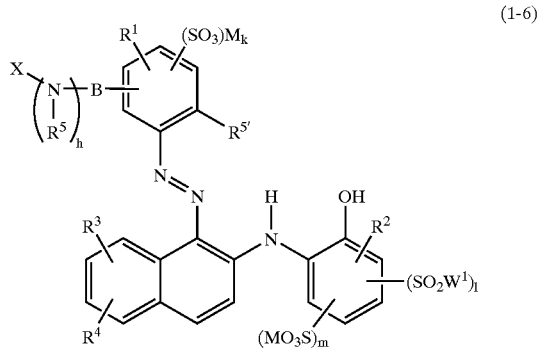

(1-6)

where
h is 0;
B is a direct bond and
X is $SO_2W^1$ and —M, $R^1$, $R^2$, $R^3$, $R^4$, $R^5$, $R^{5'}$, $W^1$, l, m and k are each as defined above are new and likewise form part of the subject matter of the present invention.

The compounds of the general formula (1-6) according to the invention are treated with a copper, cobalt or chromium donor in the presence or absence of an oxidizing agent or in the presence or absence of a demethylating agent. This reaction with copper, cobalt or chromium donors is effected similarly to known processes for synthesizing metal complexes.

Monoazo compounds of the general formula (1-6) are preferably treated with the metal donors in an aqueous medium at a temperature between 0 and 130° C., if appropriate by refluxing or under superatmospheric pressure in a closed vessel. When metal complex formation is carried out as an oxidative coppering, i.e., when $R^{5'}$ is a hydrogen atom in the compounds of the formula (1-6), a customary oxidizing agent is added.

The metal donors used in the metal complex formation process according to the invention are for example salts of copper, of cobalt and of chromium which are capable of donating the respective metal in the form of a cation to the complex formation capable hydroxyl groups in the compounds of the formula (1-1) which may have become formed in the oxidative or dealkylating metallization, for example copper sulfate, copper carbonate, cobalt sulfate, cobalt acetate and chromium sulfate; such compounds useful as metal complex formers also include hydroxycarboxylic acids or dicarboxylic acids which contain the metal bound in a complexed form, for example complex cobalt or chromium compounds of aliphatic hydrocarboxylic acids or of aliphatic dicarboxylic acids, especially of alkanes of 2 to 6 carbon atoms, or chromium complex compounds of aromatic o-hydroxycarboxylic acids, for example the chromium or cobalt complex compounds of salicylic acid, of citric acid, of lactic acid, of glycolic acid or of tartaric acid.

The monoazo compounds of the general formula (1-1) according to the invention can be separated and isolated from the aqueous synthesis solutions according to generally known methods for water-soluble compounds, for example by precipitating from the reaction medium by means of an electrolyte, for example sodium chloride or potassium chloride, or by evaporating the reaction solution itself, for example by spray drying. When the latter form of isolation is chosen, it is frequently advisable to precede the evaporating by removing any sulfate present in the solutions by precipitation as calcium sulfate and removal by filtration or pressure permeation.

The dyes of the general formula (1) according to the invention are further obtainable for example by reacting equivalent amounts of amino compounds of the general formula (3a) and (3b)

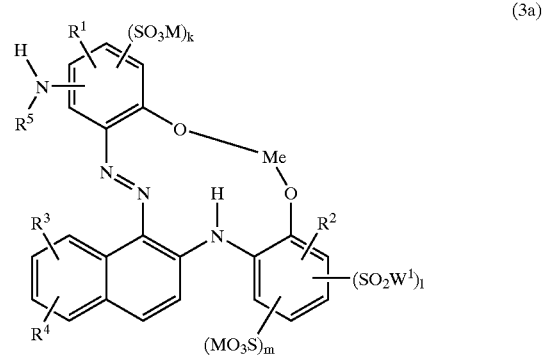

(3a)

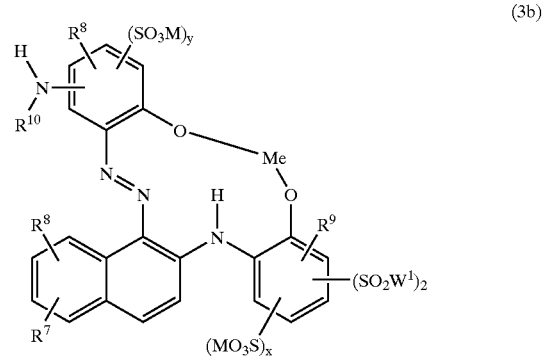

(3b)

where
Me, $R^1$ to $R^{10}$ l, m, k, x, y and z are each as defined above, with a compound of the general formula (4)

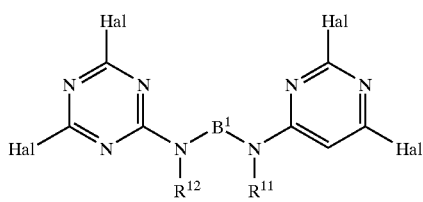

(4)

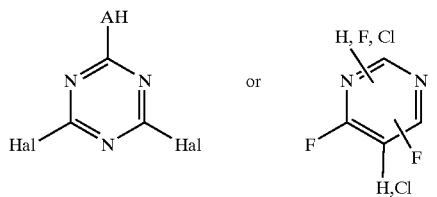

wherein $R^{11}$, $R^{12}$, $B^1$ and Hal are each as defined above, or first reacting a compound of the general formula (3a) with a compound of the general formula (5)

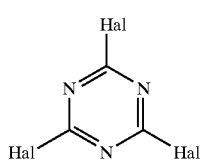

(5)

and a compound of the general formula (3b) with a compound of the general formula (5). The compounds thus obtained are subsequently reacted with each other with the stoichiometric amount of compound (6)

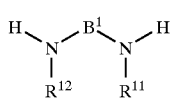

(6)

where $R^{11}$, $R^{12}$, $B^1$ are each as defined above.

Particularly preferred compounds of the general formula (5) are 2,4,6-trifluoro-1,3,5-triazine and 2,4,6-trichloro-1,3,5-triazine. Diamino starting compounds of the general formula (6) include for example 1,2-diaminoethane, 1,3-diaminopropane, 1,4-diaminobutane, 1,6-diaminohexane, 1,4-diaminocyclohexane, 1,3-diaminocyclohexane, 4-methylaminoaniline, 1,3-diaminobenzene-4-sulfonic acid, 1,4-diaminobenzene-3-sulfonic acid, 1,3-diaminobenzene-4,6-disulfonic acid, p-aminobenzenemethylamine, p-phenylenediamine, m-phenylenediamine, aminoethylpiperazine, o-phenylenediamine, m-toluenediamine, 2,4-diaminoanisole, piperazine, 1,1-bis-(4'-aminophenyl)cyclohexane, benzidine, 4,4'-diamino-3,3'-dimethoxybiphenyl-6,6'-disulfonic acid, 3,3'-dimethyl-4,4'-diaminobiphenyl-6,6'-disulfonic acid, 1,5-diaminopentane, N-(2-aminoethyl)piperazine, bis(2-aminoethyl) ether, 1,5-diaminonaphthalene, 1,8-diaminonaphthalene, 2,6-diaminonaphthalene-4,8-disulfonic acid, 1,6-diaminonaphthalene-4,8-disulfonic acid, 4-(4'-aminophenylcarbonylamino)aniline and 3-(4'-aminophenylcarbonylamino)aniline, of which preferably 1,4-diaminobenzene-3-sulfonic acid and 1,3-diaminobenzene-4,6-disulfonic acid and particularly preferably 1,2-diaminoethane, 1,3-diamino-propane, 1,6-diaminohexane, piperazine, 1,3-phenylenediamine and 1,4-phenylenediamine, 4-aminobenzylmethylamine, 3-aminobenzylmethylamine.

Further useful dyes of the general formula (1) are obtained by reacting compounds of the general formula (3a) with compounds of the general formula X-Hal, where X and Hal are each as defined above. In a particular embodiment, compounds of the general formula (3a) are reacted with compounds of the general formula

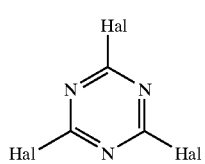

in a conventional manner.

Alternatively, compounds of the general formula (3a) are first reacted with (5)

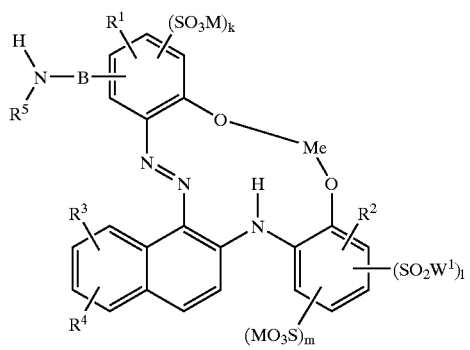

preferably cyanuric chloride or cyanuric fluoride and then with amines of the general formula AH, where AH is as defined above.

The process steps described are comprised in the prior art.

The invention further provides a process for preparing compounds of the general formula (3)

(3)

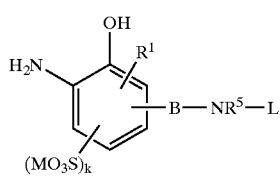

where $R^1$ to $R^5$, Me and B, k, l, m, $W^1$, M are each as defined above. Compounds of the general formula (3) are new and likewise form part of the subject matter of the invention. They are obtainable starting from amino compounds of the general formula (8a) or (8b)

(8a)

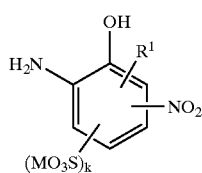

(8b)

where L is a hydrolyzable protecting group, for example formyl, $C_1$–$C_4$-alkyl-carbonyl or $C_1$–$C_4$-alkoxycarbonyl, especially acetyl, and M, B, $R^1$ and $R^5$ and also k are each as defined above, by diazotization and coupling onto a compound of the formula (1-3)

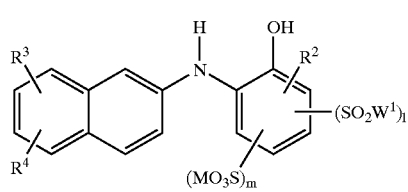

(1-3)

where $R^2$, $R^3$, $R^4$, $W^1$ l and m are each as defined above, at a temperature between 0° C. and 50° C., preferably between 10° C. and 40° C., and at a pH less than 6, preferably between 0.5 and 4.0, and subsequent reaction with copper, cobalt or chromium donors similarly to familiar processes for synthesizing metal complexes, and subsequent reduction of the nitro group in a conventional manner or hydrolysis, preferably alkaline hydrolysis, similarly to known procedures, of the protected amino group.

Amines of the general formula (8a) and (8b) which are used as diazo components in the process according to the invention include for example: 6-acetylamino-2-aminophenol-4-sulfonic acid, 2-amino-6-nitrophenol-4-sulfonic acid, 4-nitro-2-aminophenol-6-sulfonic acid, 2-amino-6-chlorophenol-4-N-hydroxyethylsulfonamide, 4-nitro-2-aminophenol, 5-nitro-2-aminophenol, 4-chloro-6-nitro-2-aminophenol, 4-chloro-6-nitro-2-aminophenol, 4-chloro-5-nitro-2-aminophenol, 6-chloro-4-nitro-2-aminophenol, 2-aminophenol-4-sulfonamide, 4-acetylamino-6-aminophenol-2-sulfonic acid.

The reactive dyes of the general formula (1) according to the invention possess useful application properties. They are used for the dyeing and printing of hydroxyl- and/or carboxamide-containing materials, for example in the form of sheetlike structures, such as paper and leather, or of films, of polyamide for example, or in bulk, as for example polyamide and polyurethane, but especially in the form of fibers of the materials mentioned. Preferably they are used for dyeing and printing cellulosic fiber materials of any kind. They are also useful for dyeing and printing hydroxyl-containing fibers present in blend fabrics, for example blends of cotton with polyester fibers or polyamide fibers. It is also possible to use them to print textiles or paper by the inkjet process.

The present invention accordingly also provides for the use of the reactive dyes of the general formula (1) according to the invention for dyeing or printing the materials mentioned and processes for dyeing or printing such materials in a conventional manner by using one or more reactive dyes of the general formula (1) according to the invention as a colorant. For this, the as-synthesized solutions of the reactive dyes of the general formula (1) according to the invention can be used directly as a liquid preparation for dyeing, if appropriate after addition of a buffer substance and similarly if appropriate after concentrating.

Hydroxyl-containing materials are those of natural or synthetic origin, for example cellulose fiber materials or regenerated products thereof and polyvinyl alcohols. Cellulose fiber materials are preferably cotton, but also other vegetable fibers, such as linen, hemp, jute and Ramie fibers. Regenerated cellulose fibers are for example staple viscose and filament viscose.

Carboxamido-containing materials are for example synthetic and natural polyamides and polyurethane, especially in the form of fibers, for example wool and other animal hairs, silk, leather, nylon-6,6, nylon-6, nylon-11 and nylon-4.

The fiber materials can also be processed and dyed in blends with each other or contain fiber materials of a different chemical nature, such as polyester fibers. Examples thereof are blend fabrics of cellulose fibers and polyester fibers and also of cellulose fibers and polyamide fibers.

The dyes according to the invention can be applied to and fixed on the substrates mentioned, especially the fiber materials mentioned, by the application techniques known for water-soluble, fiber-reactive dyes, in accordance with the use of the invention, for example by applying the compounds of the general formula (1) in dissolved form to the substrate or incorporating them thereinto and fixing them thereon or therein by heating or by the action of an alkaline agent or by both measures. Such dyeing and fixing processes are extensively described in the literature, for example in EP-A-0 181 585.

Thus the compounds (1) are useful not only for the exhaust dyeing process but also for dyeing by the pad dyeing process, whereby the material is impregnated with aqueous solutions of the dyes according to the invention, which may contain electrolyte salt, and fixed on the material in the manner mentioned above. The compounds of the general formula (1) according to the invention are particularly useful for cold pad-batch processes, whereby a dye is applied to the fiber material on a pad mangle together with alkali and is fixed by storing at room temperature for several hours. After fixing, the dyeings and prints obtained are thoroughly washed with cold and hot water, if appropriate in the presence of an agent which has a dispersing action and promotes the diffusion of unfixed portions.

The compounds of the general formula (1) are notable for high reactivity, good flexibility and good build-up capacity. They can therefore be used for exhaust dyeing at low dyeing temperatures and require only short steaming times in pad-steam processes. The fixation yields are high, and the unfixed portions are readily washed off with the difference between the degree of exhaustion and the degree of fixation being remarkably small, i.e., the loss through hydrolysis being very small. The compounds of the general formula (1) are also particularly useful in textile printing processes, especially on cellulose fiber materials, such as cotton, but also for printing carboxamide-containing fiber material, for example wool and silk, or blend fabrics containing wool or silk. They are similarly very useful in discharge printing and resist printing processes.

The dyeings and prints prepared with the compounds of the general formula (1) according to the invention, on cellulose fiber materials in particular, have a high color strength and a high fiber-dye bond stability not only in the acidic but also in the alkaline range, also good lightfastness, including very good wet lightfastness, and also generally good wetfastnesses, such as good fastness to washing, water, seawater, crossdyeing and perspiration, and also very good perspiration lightfastnesses, further good fastness to pleating and dry heat setting and rubbing.

The examples which follow illustrate the invention.

The compounds described in the examples by means of a formula are indicated in the form of the free acids; generally they are prepared and isolated in the form of their alkali metal salts, such as lithium, sodium or potassium salts, and used for dyeing in the form of their salts. Similarly, the starting compounds and components mentioned in the examples hereinbelow, especially the table examples, in the form of the free acid may be used in the synthesis as such or in the form of their salts, preferably alkali metal salts.

The absorption maxima ($\lambda_{max}$) in the visible region reported for the compounds of the invention were determined on their alkali metal salts in aqueous solution. The table examples report the $\lambda_{max}$ values in brackets next to the hue; the wavelength is given in nm.

Preparation of the dyes of the general formula (1-1) according to the invention

1. Preparation of coupling component by Bucherer reaction a.) 0.474 mol of 1,7-dihydroxynaphthalene-3-sulfonic acid, 0.57 mol of 2-aminophenol, 380 ml of water and 873 ml of 39% sodium hydrogensulfite solution are adjusted to pH 5.7 with 33% aqueous sodium hydroxide solution. After addition of 150 g of sodium chloride, the reaction mixture is refluxed at 107° C. for 20 hours. After cooling to room temperature, the product of the formula (3.1)

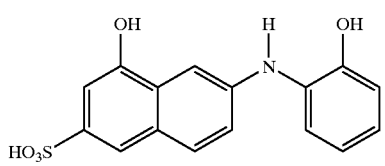

(3.1)

is isolated, washed with saturated sodium chloride solution and dried.

b.) 0.495 mol of 2-naphthol-7-sulfonic acid, 0.694 mol of 2-aminophenol-4-sulfonic acid, 400 ml of water and 921 ml of 39% sodium hydrogensulfite solution are adjusted to pH 5.8 with 33% aqueous sodium hydroxide solution. After addition of 200 g of sodium chloride, the reaction mixture is refluxed for 20 hours.

After cooling to room temperature, the product of the formula (3.2)

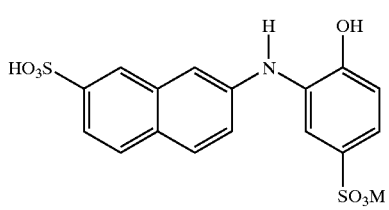

(3.2)

is isolated, washed with saturated sodium chloride solution and dried.

c.) 0.474 mol of 1,7-dihydroxynaphthalene-3-sulfonic acid, 0.57 mol of 2-hydroxy-3-sulfo-5-(β-hydroxyethylsulfonyl)aniline, 380 ml of water and 873 ml of 39% sodium hydrogensulfite solution are adjusted to pH 5.7 with 33% aqueous sodium hydroxide solution. After addition of 300 g of sodium chloride, the reaction mixture is refluxed for 20 hours. After cooling to room temperature, the product of the formula (3.3)

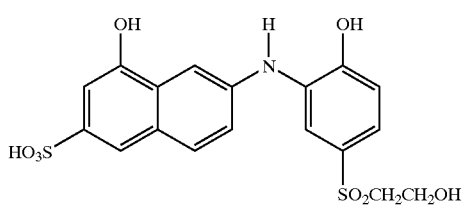

(3.3)

is isolated, washed with saturated sodium chloride solution and dried. The product is then introduced into 530 g of 100% sulfuric acid at room temperature and subsequently stirred for 5 hours. The reaction solution is discharged onto 1000 g of ice. After salting out with 200 g of potassium chloride, the product (3.4)

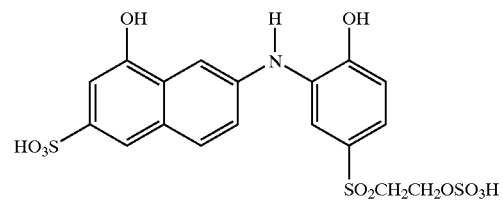

(3.4)

is isolated.

2. Preparation of dyes of the general formula (1-1)

EXAMPLE 1

0.1 mol of 2-hydroxy-5-(β-sulfatoethylsulfonyl)aniline in 400 g of water are diazotized using 35 g of 31% hydrochloric acid and 20.5 ml of sodium nitrite solution (345 g/1000 ml) at 0–5° C. over 1 h.

Excess nitrous acid is then destroyed with amidosulfonic acid and the diazonium salt suspension is admixed with 0.097 mol of 6-(6-hydroxy-3-sulfoanilino)-4-hydroxynaphthalene-2-sulfonic acid. The pH is adjusted to 1.0–1.1 and maintained there using 20% sodium carbonate solution. The coupling is carried out at 20 to 25° C.

After the coupling has ended, the pH is adjusted to 5.0–5.5 using 20% sodium carbonate solution. After addition of 25 g of copper sulfate pentahydrate, the pH is adjusted to 5.0–5.5 and maintained there.

After coppering has ended, the inventive copper complex dye of the formula (A)

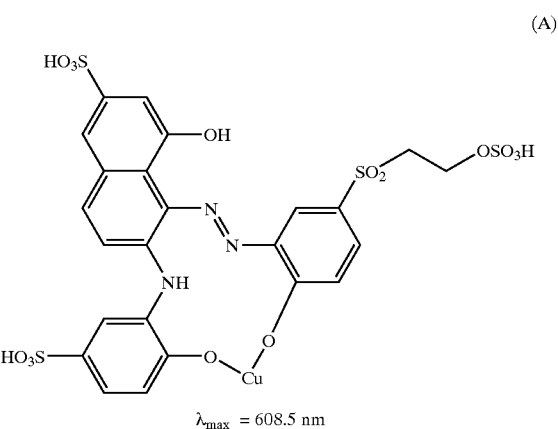

(A)

$\lambda_{max}$ = 608.5 nm is isolated by salting out with potassium chloride. The dye dyes cotton in blue shades having good fastness properties, of which the good lightfastness is particularly noteworthy.

EXAMPLE 2

The diazonium salt suspension described in Example 1 is admixed with 0.95 mol of 6-[6-hydroxy-3-(β-sulfatoethylsulfonyl)anilino]-4-hydroxynaphthalene-2-sulfonic acid (compound of the formula (3.4)). The coupling is carried out under the conditions mentioned in Example 1. After coupling has ended, the red dye of the formula (B)

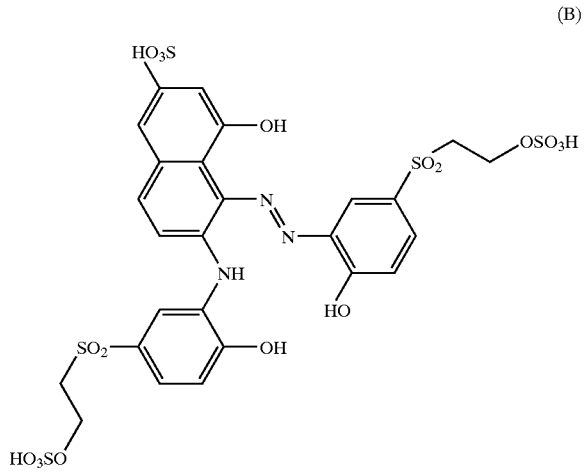

(B)

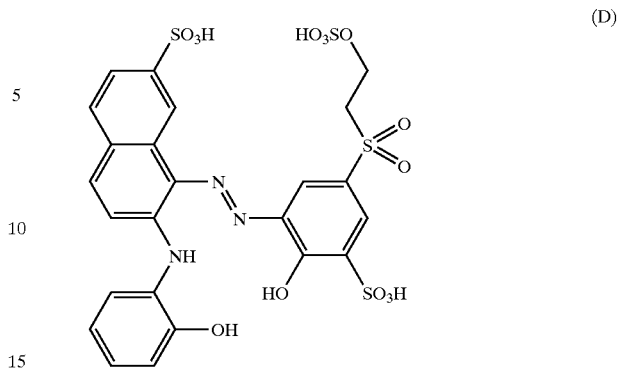

(D)

can be isolated after addition of ethanol, if purification is needed. The isolated product is dissolved at room temperature in 1000 ml. After addition of 25 g of copper sulfate pentahydrate, the coppering is carried out as described in Example 1. After coppering has ended, excess copper not bound in a complex is precipitated as copper sulfide by addition of a little sodium sulfide and filtered off.

The inventive copper complex dye of the formula (C)

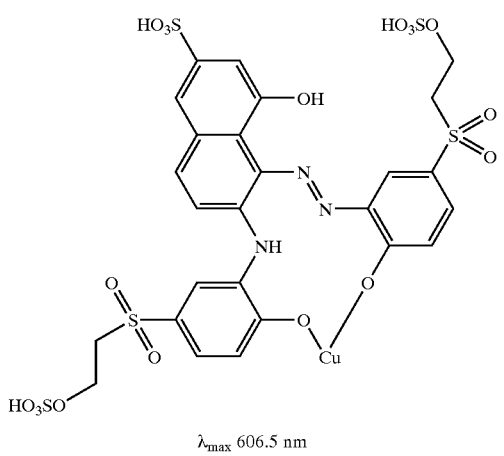

$\lambda_{max}$ 606.5 nm (C)

is isolated by evaporating the dye solution, adjusted to pH 5.0–5.5, under reduced pressure or by spray drying this solution. The dye dyes cotton in navy dyeings having very good lightfastnesses and wetfastnesses.

EXAMPLE 3

0.1 mol of 2-hydroxy-3-sulfo-5-(β-sulfatoethylsulfonyl)aniline in 250 ml is diazotized using 35 g of 31% hydrochloric acid and 20.5 ml of sodium nitrite solution (345 g/1000 ml) at 0–5° C. over 1 h. Excess nitrous acid is then destroyed as usual with amidosulfonic acid and then 0.95 mol of 7-(2-hydroxyanilino)naphthalene-2-sulfonic acid is added. The pH is adjusted to 1.3 and maintained there using 20% sodium carbonate solution. The coupling is carried out at 35–40° C. After coupling has ended, the precipitated dye of the formula (D)

is isolated and suspended in 400 ml. After addition of 25 g of copper sulfate pentahydrate, the pH is adjusted to 5.0–5.5, and maintained there, with 20% sodium carbonate solution.

After coppering has ended, the inventive copper complex dye of the formula (E)

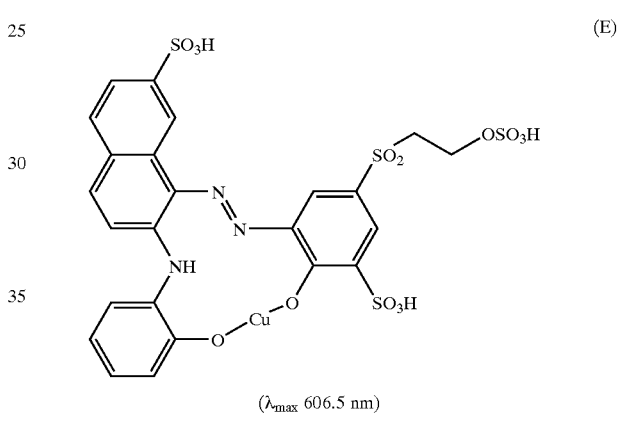

($\lambda_{max}$ 606.5 nm)

(E)

is isolated by salting out with potassium chloride. The dye dyes cotton by the printing and dyeing methods known in the art in greenish blues having excellent light- and wetfastnesses.

EXAMPLE 4

0.1 mol of 4-(β-sulfatoethylsulfonyl)aniline in 300 ml is diazotized with 35 g of 31% hydrochloric acid and 20.5 ml of sodium nitrite solution (345 g/1000 ml) at 0–5° C. over an hour. Excess nitrous acid is then destroyed With amidosulfonic acid. The reaction mixture is subsequently mixed with 0.097 mol of 6-(2-hydroxyanilino)-4-hydroxynaphthalene-2-sulfonic acid. The pH is adjusted to 1.1–1.3 and maintained there using 20% sodium carbonate solution. The coupling is carried out at 10 to 20° C. After coupling has ended, 30 g of copper sulfate pentahydrate are added, followed by 40 g of sodium acetate. The pH is adjusted to 5.0 to 5.2 using 20% sodium carbonate solution. 27 g of 30% hydrogen peroxide solution are then added dropwise at 20–30° C. and pH 50–5.2 over 2 hours. Following two hours of subsequent stirring, the dye solution is clarified by adding Celite. The resulting dye of the formula (F)

(F)

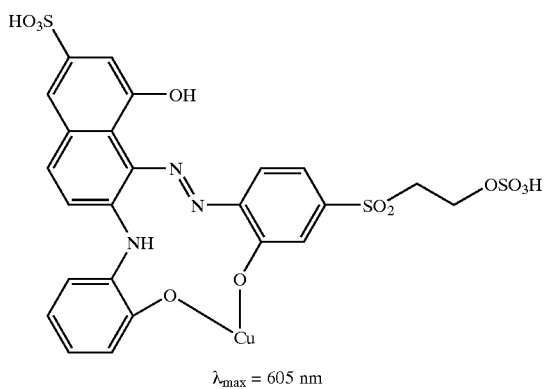

$\lambda_{max} = 605$ nm is isolated by salting out with potassium chloride. The dye produces blue dyeings of very good lightfastness on cotton.

Table 1 which follows describes further metal complex dyes which are preparable similarly to the methods described in Examples 1–4.

TABLE 1

| Ex. | Diazo component | Coupling component | Metal | Hue |
|---|---|---|---|---|
| 5 | 2-hydroxy-5-(β-sulfato-ethyl-sulfonyl)aniline | 7-(2-hydroxyanilino)-naphthalene-2-sulfonic acid | Cu | greenish blue |
| 6 | 2-hydroxy-3-sulfo-5-(vinyl-sulfonyl)aniline | 7-(2-hydroxyanilino)-naphthalene-2-sulfonic acid | Cu | greenish blue |
| 7 | 2-methoxy-5-(β-sulfato-ethyl-sulfonyl)aniline | 7-(2-hydroxyanilino)-naphthalene-2-sulfonic acid | Cu | greenish blue |
| 8 | 2-hydroxy-3-sulfo-5-(β-sulfatoethylsulfonyl)aniline | 6-(2-hydroxyanilino)-4-hydroxynaphthalene-2-sulfonic acid | Cu | blue |
| 9 | 2-hydroxy-3-sulfo-5-(β-sulfatoethylsulfonyl)aniline | 6-(2-hydroxyanilino)-4-hydroxynaphthalene-2-sulfonic acid | Co | blue |
| 10 | 2-methoxy-5-(β-sulfato-ethyl-sulfonyl)aniline | 6-(2-hydroxyanilino)-4-hydroxynaphthalene-2-sulfonic acid | Cu | blue |
| 11 | 2-hydroxy-5-(β-sulfato-ethyl-sulfonyl)aniline | 6-(2-hydroxyanilino)-4-hydroxynaphthalene-2-sulfonic acid | Cu | blue |
| 12 | 2-hydroxy-5-(β-chloro-ethyl-sulfonyl)aniline | 6-(2-hydroxyanilino)-4-hydroxynaphthalene-2-sulfonic acid | Cu | blue |
| 13 | 2-hydroxy-5-(vinyl-sulfonyl)-aniline | 6-(2-hydroxyanilino)-4-hydroxynaphthalene-2-sulfonic acid | Cu | blue |
| 14 | 2,5-dimethoxy-4-(β-sulfato-ethylsulfonyl)aniline | 6-(2-hydroxyanilino)-4-hydroxynaphthalene-2-sulfonic acid | Cu | blue |
| 15 | 2-methoxy-5-methyl-4-(β-sulfatoethylsulfonyl)aniline | 6-(2-hydroxyanilino)-4-hydroxynaphthalene-2-sulfonic acid | Cu | blue |
| 16 | 2-hydroxy-3-sulfo-5-(β-sulfatoethylsulfonyl)aniline | 6-(3-chloro-6-hydroxy-anilino)-4-hydroxy-naphthalene-2-sulfonic acid | Cu | blue |
| 17 | 2-hydroxy-5-(β-sulfato-ethyl-sulfonyl)aniline | 7-(2-hydroxyanilino)-naphthalene-2,4-disulfonic acid | Cu | navy |
| 18 | 2-methoxy-5-(β-sulfato-ethyl-sulfonyl)aniline | 7-(2-hydroxyanilino)-naphthalene-2,4-disulfonic acid | Cu | navy |
| 19 | 2-hydroxy-3-sulfo-5-(β-sulfatoethylsulfonyl)aniline | 7-(2-hydroxyanilino)-naphthalene-2,4-disulfonic acid | Cu | navy |
| 20 | 2-hydroxy-3-sulfo-5-(β-sulfatoethylsulfonyl)aniline | 7-(3-chloro-6-hydroxy-anilino)napthalene-2,4-disulfonic acid | Cu | navy |

TABLE 1-continued

| Ex. | Diazo component | Coupling component | Metal | Hue |
|---|---|---|---|---|
| 21 | 2-hydroxy-3-sulfo-5-(β-sulfatoethylsulfonyl)aniline | 7-(2-hydroxy-4-methyl-anilino)-naphthalene-2-sulfonic acid | Cu | navy |
| 22 | 2-hydroxy-3-sulfo-5-(β-sulfatoethylsulfonyl)aniline | 7-(6-hydroxy-3-sulfo-anilino)-naphthalene-2-sulfonic acid | Cu | greenish blue |
| 23 | 2-hydroxy-5-(β-sulfato-ethyl-sulfonyl)aniline | 7-(6-hydroxy-3-sulfo-anilino)-naphthalene-2-sulfonic acid | Cu | greenish blue |
| 24 | 2-hydroxy-5-(vinylsul-fonyl)-aniline | 7-(6-hydroxy-3-sulfo-anilino)-naphthalene-2-sulfonic acid | Cu | greenish blue |
| 25 | 2,5-dimethoxy-4-(β-sulfato-ethylsulfonyl)aniline | 7-(6-hydroxy-3-sulfo-anilino)-naphthalene-2-sulfonic acid | Cu | greenish blue |
| 26 | 2-hydroxy-5-(β-sulfato-ethyl-sulfonyl)aniline | 7-(2-hydroxy-4-methyl-anilino)-naphthalene-2-sulfonic acid | Cu | greenish blue |
| 27 | 2-hydroxy-5-(β-sulfato-ethyl-sulfonyl)aniline | 7-(2-hydroxy-5-car-boxy-anilino)-naphthalene-2-sulfonic acid | Cu | greenish blue |
| 28 | 2-hydroxy-3-sulfo-5-(β-sulfatoethylsulfonyl)aniline | 6-(2-hydroxyanilino)-naphthalene-2-sulfonic acid | Cu | bluish black |
| 29 | 2-hydroxy-3-sulfo-5-(β-sulfatoethylsulfonyl)aniline | 6-(3-chloro-6-hydroxy-anilino)-naphthalene-2-sulfonic acid | Cu | bluish black |
| 30 | 2-hydroxy-3-sulfo-5-(β-sulfatoethylsulfonyl)aniline | 6-(3-chloro-6-hydroxy-anilino)-naphthalene-2-sulfonic acid | Cu | bluish black |
| 31 | 2-hydroxy-3-sulfo-5-(β-sulfatoethylsulfonyl)aniline | 6-(3-chloro-6-hydroxy-anilino)-naphthalene-2-sulfonic acid | Co | black |
| 32 | 2-hydroxy-3-sulfo-5-(β-sulfatoethylsulfonyl)aniline | 6-(2-hydroxyanilino)-naphthalene-2-sulfonic acid | Cu | bluish black |
| 33 | 2-hydroxy-3-sulfo-5-(β-sulfatoethylsulfonyl)aniline | 6-(6-hydroxy-3-sulfo-anilino)-2-sulfonic acid | Cu | greenish blue |
| 34 | 2-hydroxy-3-sulfo-5-(β-sulfatoethylsulfonyl)aniline | 6-(6-hydroxy-3-sulfo-anilino)-2-sulfonic acid | Cu | greenish blue |
| 35 | 2-hydroxy-5-(β-sulfato-ethyl-sulfonyl)aniline | 7-(2-hydroxyanilino)-4-hydroxynaphthalene-2-sulfonic acid | Cu | black |
| 36 | 2-hydroxy-3-sulfo-5-(β-sulfatoethylsulfonyl)aniline | 7-(2-hydroxyanilino)-4-hydroxynaphthalene-2-sulfonic acid | Cu | black |
| 37 | 2-hydroxy-3-sulfo-5-(β-sulfatoethylsulfonyl)aniline | 7-(3-chloro-6-hydroxy-anilino)-4-hydroxy-naphthalene-2-sulfonic acid | Cu | bluish black |
| 38 | 2-hydroxy-3-sulfo-5-(vinylsulfonyl)aniline | 7-(2-hydroxyanilino)-4-hydroxynaphthalene-2-sulfonic acid | Cu | black |
| 39 | 2-hydroxy-3-sulfo-5-(vinylsulfonyl)aniline | 7-(6-hydroxy-3-sulfo-anilino)-4-hydroxy-naphthalene-2-sulfonic acid | Cu | black |
| 40 | 2-hydroxy-5-(β-sulfato-ethylsulfonyl)aniline | 7-(6-hydroxy-3-sulfo-anilino)-4-hydroxy-naphthalene-2-sulfonic acid | Cu | black |
| 41 | 2-hydroxy-5-(β-sulfato-ethylsulfonyl)aniline | 7-(6-hydroxy-3-sulfo-anilino)-4-hydroxy-naphthalene-2-sulfonic acid | Co | reddish black |
| 42 | 2-hydroxy-3-sulfo-5-(β-sulfatoethylsulfonyl)aniline | 7-(6-hydroxy-3-sulfo-anilino)-4-hydroxy-naphthalene-2-sulfonic acid | Cu | black |

Preparation of dyes of the general formula (1) according to the invention

EXAMPLE 43

0.1 mol of 6-acetylamino-2-aminophenol-4-sulfonic acid in 250 g of water are diazotized with 2.8 g of 96% sulfuric acid and 20.5 ml of sodium nitrite solution (345 g/1000 ml) at 5–10° C. over 1 hour. The pH should not rise above 1.5. Excess nitrous acid is then destroyed with amidosulfonic acid and the diazonium salt suspension is admixed with 0.1 mol of 6-(6-hydroxy-3-sulfoanilino)-4-hydroxynaphthalene-2-sulfonic acid. The coupling is carried out at a pH of 1.3–1.4 and a temperature of 40° C.

After the coupling has ended, the compound of the formula (G) is isolated by salting out with potassium chloride.

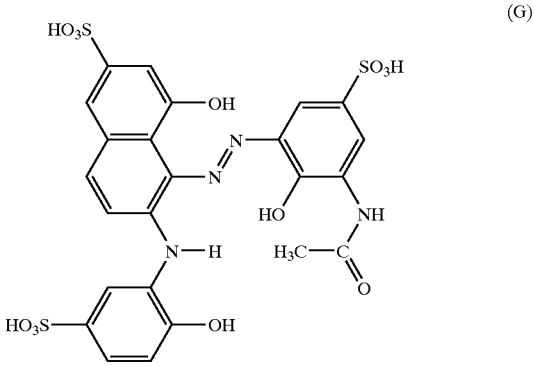

(G)

The isolated compound of the formula (G) is suspended in 1000 g of water. 20% sodium carbonate solution is used to adjust the pH to 5.0–5.5. After addition of 25 g of copper sulfate pentahydrate, the pH is again adjusted to 5.0–5.5 and maintained there. After the coppering has ended, 150 g of 33% aqueous sodium peroxide solution are added. The reaction solution is refluxed for 5 hours and then filtered, the filtrate is adjusted to pH 7 with 33% hydrochloric acid and the compound of the formula (H) is isolated by salting out with potassium chloride and then dried. It is advisable to determine the purity of the compound before any further reaction.

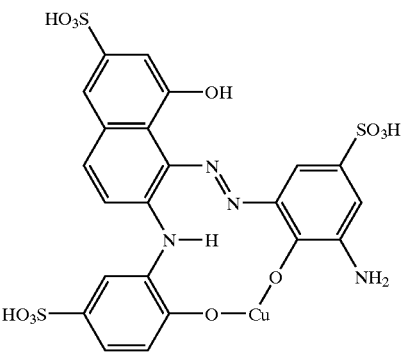

(H)

0.05 mol of the compound of the formula (B) is dissolved in 500 g of water. 0.06 mol of 2,4,6-trifluoropyrimidine is added at pH 6.5 and room temperature. 20% sodium carbonate solution is used to maintain the pH at 6.5. The temperature is raised to 30° C.–35° C. After the reaction has ended, the dye of the formula (J) according to the invention

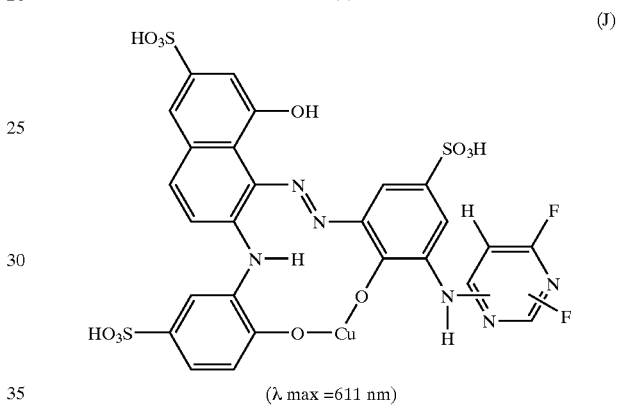

(J)

($\lambda$ max =611 nm)

is isolated by salting out with potassium chloride. The dye dyes cotton in blue shades having good fastness properties, of which especially the good lightfastness is to be emphasized.

EXAMPLE 44

0.1 mol of 4-($\beta$-sulfatoethylsulfonyl)aniline is dissolved in 100 g of water at 0° C. and pH 6.5. After addition of 4.5 g of sodium fluoride, 0.11 mol of 2,4,6-tri-fluoro-1,3,5-triazine is added very rapidly at 0° C. The temperature must not rise above 0° C. The pH is then adjusted to 6.5 with 20% sodium carbonate solution. This suspension is admixed with a solution in 1000 g of water in 0.9 mol of the compound of the formula (H) described in example 43. The reaction mixture is allowed to warm to room temperature and the pH is maintained at 6.0–6.5. The dye of the formula (K) according to the invention

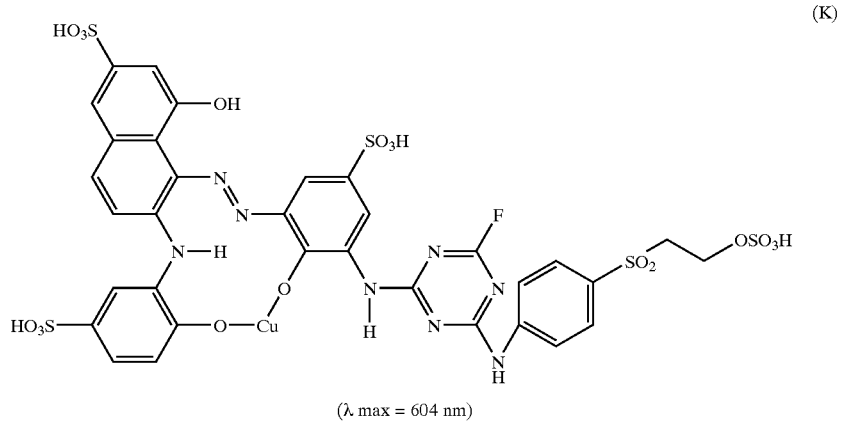

(K)

($\lambda$ max = 604 nm)

is isolated by salting out with potassium chloride. The dye produces blue dyeings of very good lightfastness on cotton.

EXAMPLE 45

0.1 mol of 6-acetylamino-2-aminophenol-4-sulfonic acid is diazotized according to the directions in example 43. The diazonium salt solution is admixed with a solution of 0.095 mol of 7-(2-hydroxyanilino)naphthalene-2-sulfonic acid in about 300 g of water. The coupling is carried out at a pH of 1.3–1.5 at 40° C. After the coupling has ended, 25 g of copper sulfate pentahydrate are added. 20% sodium carbonate solution is used to set the pH to 5.0–5.5 and maintain it there. After the coppering has ended, 150 g of 33% aqueous sodium hydroxide solution are added.

The reaction mixture is refluxed. After the hydrolysis has ended, the reaction solution is adjusted to pH 7 with 33% sodium hydrochloric acid and filtered and the compound of the formula (L) is isolated by salting out with sodium chloride.

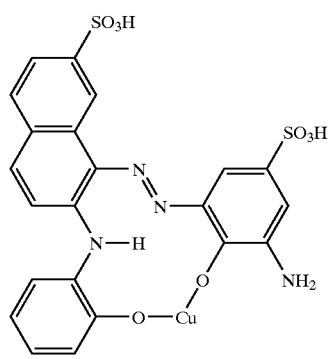

(L)

0.05 mol of the compound of the formula (L) is then dissolved in 400 g of water at pH 6.5–7.0 and cooled down to 0° C. At 0° C., 0.075 mol of 2,4,6-trifluoro-1,3,5-triazine is added over 10 min. During the addition, the pH is maintained at 6.5–7.0 with 20% sodium carbonate solution. The pH is then adjusted to 3.0 with 15% hydrochloric acid, and the batch is stirred at 0° C. for 10 min. This is followed by the addition of 0.053 mol of morpholine.

20% sodium carbonate solution is used to maintain a pH of 7.0–7.5. The reaction temperature is allowed to rise to 10–15° C.

After the reaction has ended, the copper complex dye of the formula (M) according to the invention

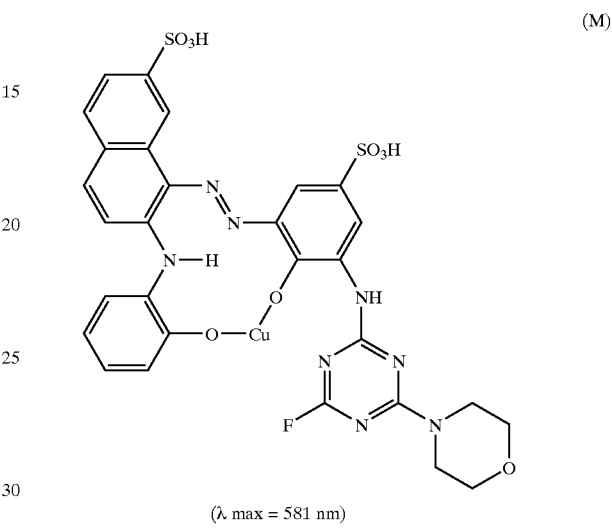

(M)

(λ max = 581 nm)

is isolated by salting out with sodium chloride. The dye dyes cotton in greenish blues by the printing and dyeing processes known in the art.

Table 2 below describes further metal complex dyes of the general formula (1), which are preparable similarly to the experiments described in examples 43–45.

TABLE 2

| Example | —X | Hue |
|---|---|---|
| 46 | ![pyrimidine with F, F, CH3] | reddish navy |
| 47 | ![triazine-NH-phenyl-SO2-CH2CH2-OSO3H with F] | reddish navy |
| 48 | ![triazine-N(CH3)-CH2CH2-SO2-CH2CH2-OSO3H with F] | reddish navy |

TABLE 2-continued

| Example | —X | Hue |
|---|---|---|
| 49 | 4-chloro-6-methyl-1,3,5-triazin-2-yl-NH-C6H4-SO2-CH2CH2-OSO3H | reddish navy |
| 50 | 5-chloro-6-fluoro-4-methylpyrimidin-2-yl | reddish navy |
| 51 | 4-fluoro-6-methyl-1,3,5-triazin-2-yl-NH-CH2CH2-O-CH2CH2-SO2-CH=CH2 | reddish navy |
| 51A | 4-(N-cyanoamino)-6-methyl-1,3,5-triazin-2-yl-NH-C6H4-SO2-CH2CH2-OSO3H | reddish navy |
| 52 | 4-fluoro-6-methyl-1,3,5-triazin-2-yl-NH-CH2CH2-SO2-CH=CH2 | reddish navy |
| 53 | 4-fluoro-6-methyl-1,3,5-triazin-2-yl-N(C2H5)(C6H5) | reddish navy |
| 54 | 4-chloro-6-methyl-1,3,5-triazin-2-yl-NH-C6H4-SO3H (ortho) | reddish navy |

TABLE 2-continued
| Example | —X | Hue |
|---|---|---|
| 55 | 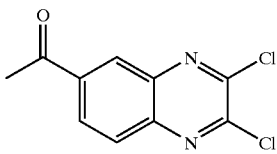 | reddish navy |
| 56 | 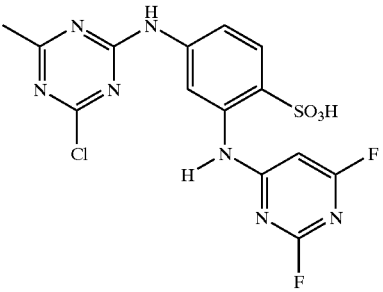 | reddish navy |
| 57 | 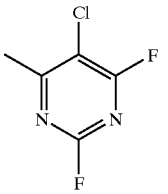 | reddish navy |
| 58 | 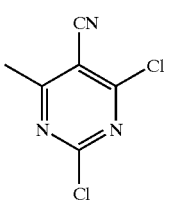 | reddish navy |
| 59 | 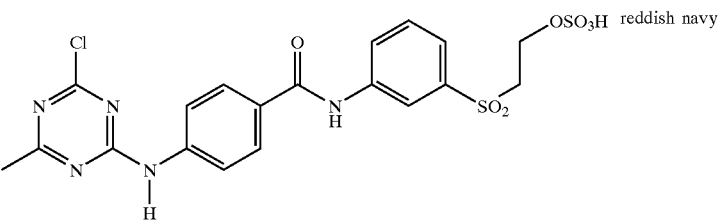 | reddish navy |

Table 3 describes further metal complex dyes of the general formula (II), which are preparable similarly to the experiments described in examples 43–45.

TABLE 3

(II)

| Example | —X | Hue |
|---|---|---|
| 60 | difluoropyrimidinyl | navy |
| 61 | 5-chloro-6-methyl-2,4-difluoropyrimidinyl | navy |
| 62 | 4-methyl-6-chloro-1,3,5-triazinyl-2-amino-(4-(β-sulfatoethylsulfonyl)phenyl) | navy |
| 63 | 4-methyl-6-morpholino-1,3,5-triazin-2-yl with F | navy |
| 64 | 4-methyl-6-fluoro-1,3,5-triazin-2-yl-amino-(3-sulfophenyl) | navy |
| 65 | 4-methyl-6-fluoro-1,3,5-triazin-2-yl-N(Ph)-CH₂CH₂SO₂CH₂CH₂OSO₃H | navy |
| 66 | 4-methyl-6-fluoro-1,3,5-triazin-2-yl-amino-(3-(NHCO-CH₂CH₂SO₂-vinyl)phenyl) | navy |
| 67 | 4-methyl-6-fluoro-1,3,5-triazin-2-yl-amino-(4-chlorophenyl) | navy |
| 68 | 4-methyl-6-chloro-1,3,5-triazin-2-yl-amino-(3-(SO₂CH₂CH₂OSO₃H)phenyl) | navy |

TABLE 3-continued (II)

[Structure of formula (II): a copper complex dye with sulfonic acid groups, azo linkage, naphthalene moiety, and an NH-phenyl-NH-X substituent]

| Example | —X | Hue |
|---|---|---|
| 69 | [pyrimidine with CN, Cl, Cl, methyl substituents] | navy |
| 70 | [chlorotriazine-NH-phenyl(SO3H)-NH-difluoropyrimidine] | navy |
| 71 | [methyl-dichloro-triazine] | navy |
| 72 | [methyl-(HN-CN)-triazine-NH-phenyl-SO2CH2CH2OSO3H] | navy |

Table 4 below describes further metal complex dyes of the general formula (III), which are preparable similarly to the experiments described in examples 43–45.

TABLE 4

(III)

[Structure of formula (III): a copper complex dye with naphthalene-SO3H, azo linkage, phenyl-SO3H, NH-X substituent]

| Example | —X | Hue |
|---|---|---|
| 73 | [pyrimidine with Cl, F, F, methyl substituents] | greenish navy |
| 74 | [pyrimidine with F, F, F, H substituents] | greenish navy |
| 75 | [pyrimidine with Cl, F, methyl, H substituents] | greenish navy |
| 76 | [acetyl-quinoxaline with two Cl substituents] | greenish navy |
| 77 | [methyl-(HN-CN)-chloro-triazine] | greenish navy |
| 78 | [methyl-triazine-N(CH3)-CH2CH2-SO2-CH2CH2-OSO3H, with F] | greenish navy |

TABLE 4-continued (III) [Structure: naphthalene with two SO₃H groups, NH linked to benzene with SO₃H, azo group, Cu complex with O linkages, benzene with SO₃H and NH-X]

| Example | —X | Hue |
|---|---|---|
| 79 | [methyl-triazine-F with NH-phenyl-SO₂-CH₂CH₂-OSO₃H] | greenish navy |
| 80 | [methyl-triazine-F with NH-CH₂CH₂-O-CH₂CH₂-SO₂-CH₂CH₂-Cl] | greenish navy |
| 81 | [methyl-triazine-F with N(C₂H₅)-phenyl-SO₂-CH₂CH₂-OSO₃H] | greenish navy |
| 82 | [methyl-triazine-Cl with NH-phenyl-SO₃H] | greenish navy |
| 83 | [methyl-triazine-F with morpholino group] | greenish navy |
| 84 | [methyl-pyrimidine with CN, two Cl] | greenish navy |
| 85 | [methyl-triazine with two Cl] | greenish navy |
| 86 | [methyl-triazine with HN-CN and NH-phenyl-SO₂-CH₂CH₂-OSO₃H] | greenish navy |

Table 5 below describes further metal complex dyes of the general formula (IV), which are preparable similarly to the experiments described in examples 43–45.

TABLE 5

(IV) [Structure: naphthalene with SO₃H, linked via N=N azo to phenyl ring, with Cu complex, NH to ortho-hydroxyphenyl (O-Cu), and another ring with SO₃H and NH-X]

| Example | —X | Hue |
|---|---|---|
| 87 | 5-chloro-6-methyl-2,4-difluoropyrimidin-yl | greenish navy |
| 88 | 6-methyl-2,4-difluoropyrimidin-5-yl (H at 5) | greenish navy |
| 89 | 5,6-difluoro-4-methylpyrimidin-2-yl | greenish navy |
| 90 | 5-chloro-6-fluoro-4-methylpyrimidin-2-yl | greenish navy |
| 91 | 4-methyl-6-fluoro-1,3,5-triazin-2-yl-NH-phenyl-SO₂-CH₂CH₂-OSO₃H | greenish navy |

TABLE 5-continued (IV) [same structure as above]

| Example | —X | Hue |
|---|---|---|
| 92 | 4-methyl-6-fluoro-1,3,5-triazin-2-yl-N(C₂H₅)-phenyl(meta)-SO₂-CH₂CH₂-OSO₃H | greenish navy |

Table 6 below describes further metal complex dyes of the general formula (V), which are preparable similarly to the experiments described in examples 43–45.

TABLE 6

(V) [Structure: naphthalene with OH and SO₃H, linked via N=N azo with Cu complex, NH to phenyl-SO₃H with O-Cu, and another ring with SO₃H and NH-X]

| Example | —X | Hue |
|---|---|---|
| 93 | 5-chloro-6-methyl-2,4-difluoropyrimidin-yl | black |

TABLE 6-continued (V) [Structure: Cu metal complex azo dye with naphthalene bearing OH, SO₃H groups, linked via N=N to phenyl ring with SO₃H and NH-X substituents, coordinated to Cu with O linkages, and NH-phenyl-SO₃H group]

| Example | —X | Hue |
|---|---|---|
| 94 | [4-fluoro-pyrimidin-2-yl with H] | black |
| 95 | [2,4,5-trichloro-6-methylpyrimidinyl] | black |
| 96 | [6-methyl-4-fluoro-triazinyl-NH-phenyl-SO₂-CH₂CH₂-OSO₃H] | black |
| 97 | [6-methyl-4-chloro-triazinyl-N(CH₃)-CH₂CH₂-SO₂-CH₂CH₂-OSO₃H] | black |

TABLE 7

(VI) [Structure: Cu metal complex azo dye similar to (V) with naphthalene-OH, SO₃H, N=N linkage to phenyl with SO₃H and NH-X, Cu coordinated via O, and NH-phenyl-O linkage]

| Example | —X | Hue |
|---|---|---|
| 98 | [5-chloro-4,6-difluoro-2-methylpyrimidinyl, 2-F] | black |
| 99 | [4-fluoro-6-methylpyrimidinyl with H, 2-F] | black |
| 100 | [4-fluoro-6-methyl-triazinyl-NH-(3-SO₂CH₂CH₂OSO₃H)phenyl] | black |
| 101 | [chloro-methyl-triazinyl-NH-phenyl(SO₃H)-NH-(2-fluoro-pyrimidinyl)] | black |
| 102 | [6-methyl-4-chloro-triazinyl-N(CH₃)-CH₂CH₂-SO₂-CH₂CH₂-OSO₃H] | black |
| 103 | [6-methyl-4-fluoro-triazinyl-NH-phenyl-C(O)NH-CH₂CH₂-SO₂-CH=CH₂] | black |

Table 6 below describes further metal complex dyes of the general formula (VI), which are preparable similarly to the experiments described in examples 43–45.

TABLE 7-continued (VI)

[Structure: Cu metal complex dye with naphthalene bearing OH and SO₃H, azo linkage to phenyl ring with SO₃H and NH-X, connected via NH to phenyl-O-Cu]

| Example | —X | Hue |
|---|---|---|
| 104 | [methyl-chloro-triazine with HN-CN substituent] | black |

Table 9 below describes further metal complex dyes of the general formula (VII), which are preparable similarly to the experiments described in examples 43–45.

TABLE 8

(VII)

[Structure: Cu metal complex dye of formula VII with naphthalene bearing SO₃H groups, azo linkage, phenyl with SO₃H and X-NH substituents]

| Example | —X | Hue |
|---|---|---|
| 105 | [difluoropyrimidine] | navy |
| 106 | [chloro-fluoro-methylpyrimidine with F] | navy |
| 107 | [methyl-fluoro-triazine linked via NH to phenyl-SO₂-CH₂CH₂-OSO₃H] | navy |
| 108 | [methyl-fluoro-triazine linked via NH-CH₂CH₂-SO₂-CH₂CH₂-OSO₃H] | navy |
| 109 | [methyl-triazine with NH-CN and NH-phenyl-SO₂-CH₂CH₂-OSO₃H] | navy |

Table 8 below describes further metal complex dyes of the general formula (VIII), which are preparable similarly to the experiments described in examples 43–45.

TABLE 9

(VIII) [Structure of metal complex dye with Cu, showing naphthalene with OH, SO₃H groups, azo linkage, NH-X substituent, and phenyl ring with SO₃H]

| Example | —X | Hue |
|---------|----|----|
| 110 | [pyrimidine with 2 F substituents, H] | navy |
| 111 | [pyrimidine with Cl, CH₃, 2 F substituents] | navy |
| 112 | [triazine with CH₃, F, and NH-phenyl-SO₂CH₂CH₂OSO₃H] | navy |

TABLE 10

(IX) [Structure of metal complex dye with Cu, similar to VIII with different arrangement]

| Example | —X | Hue |
|---------|----|----|
| 113 | [pyrimidine with 2 F, H] | navy |
| 114 | [pyrimidine with Cl, CH₃, 2 F] | navy |
| 115 | [triazine with CH₃, NH-CN, NH-phenyl-SO₂CH₂CH₂OSO₃H] | navy |
| 116 | [triazine with CH₃, Cl, N(CH₃)CH₂CH₂SO₂CH₂CH₂OSO₃H] | navy |
| 117 | [triazine with CH₃, F, NH-phenyl-SO₂CH₂CH₂OSO₃H] | navy |
| 118 | [triazine with CH₃, Cl, NH-phenyl-NH-pyrimidine(2F), HO₃S] | navy |

Table 10 below describes further metal complex dyes of the general formula (IX), which are preparable similarly to the experiments described in examples 43–45.

EXAMPLE 119

0.1 mol of the compound of the formula (H) described in example 43 is dissolved in 1000 g of water. After addition of 300 g of ice, 0.125 mol of 2,4,6-trifluoro-1,3,5-triazine is added at 0° C. and pH 6.5 over 15 min. During the addition, the pH is maintained at 6.5–7.0 with 20% sodium carbonate solution. The pH is then adjusted to 3.0 with 15% hydrochloric acid. The batch is stirred at 0° C. for 10 min. This is followed by the addition of 0.45 mol of 1,3-diaminopropane.

20% sodium carbonate solution is used to adjust the pH to 8.0–8.5 and maintain it there. The batch is stirred at 20° C. for 2 hours.

The dye of the formula (N) according to the invention triazine, 20 g of ice and 0.25 g of Humectol is added at a pH=6.5–7.0 and 10–15° C. over 15 minutes. The pH is maintained at 6.5–7.0 with 20% sodium carbonate solution. The reaction mixture is stirred at 20° C. for 2 hours. This is followed by the addition of 0.02 mol of N-(2-aminoethyl)-piperazine over 15 min. 20% sodium carbonate solution is used to adjust the pH to 9.0–9.5 and maintain it there. The batch is subsequently stirred at 20–25° C. for 1 hour The dye of the formula (O) according to the invention

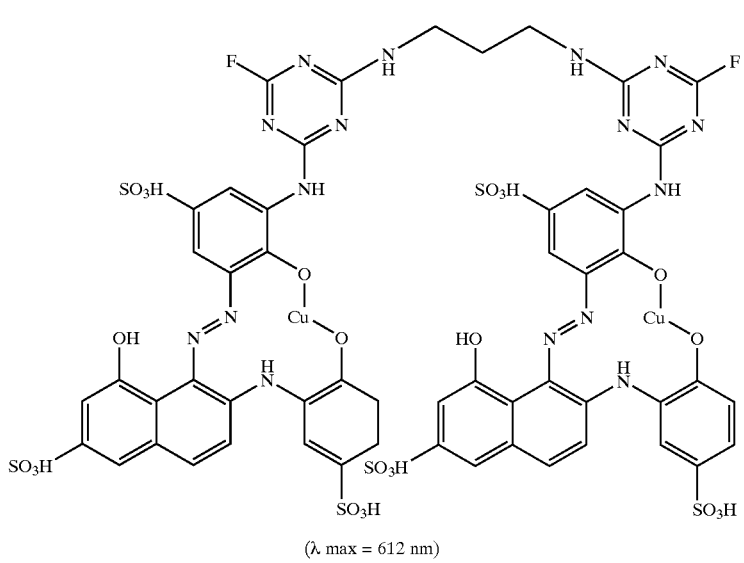

($\lambda$ max = 612 nm)

is isolated by salting out with sodium chloride. The dye dyes cotton in blue shades having good fastnesses, of which especially the good lightfastness is to be emphasized.

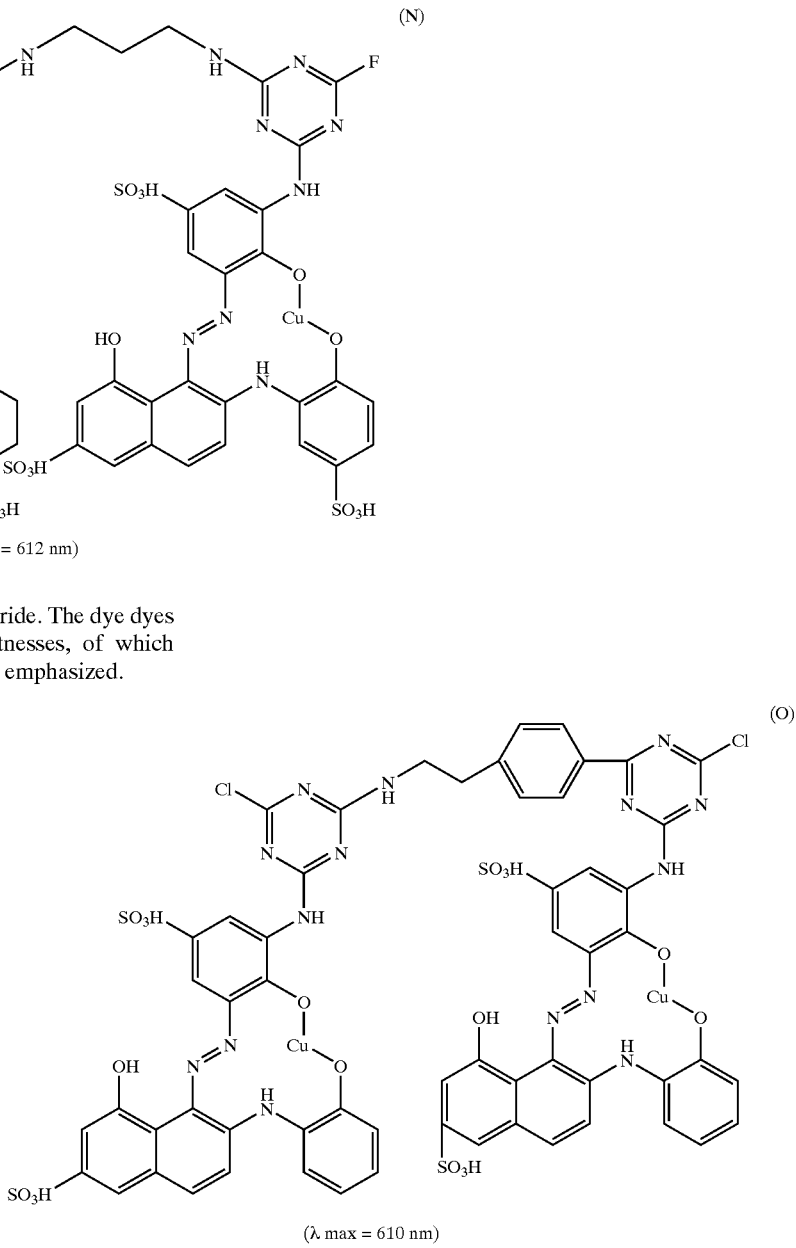

($\lambda$ max = 610 nm)

EXAMPLE 120

0.04 mol of the compound of the formula (H) described in example 43 is dissolved in 700 g of water. A suspension obtained by stirring up 0.041 mol of 2,4,6-trichloro-1,3,5- is isolated by salting out with sodium chloride. The dye dyes cotton in bluish black shades having good fastnesses, of which especially the good lightfastness is to be emphasized.

The examples in table 11 show further correspondingly prepared dyes.

TABLE 11
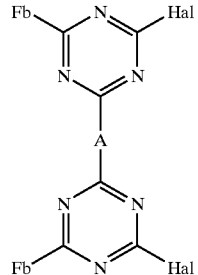
| Ex. | Fb— | —A— | Hal | Hue |
|---|---|---|---|---|
| 121 | 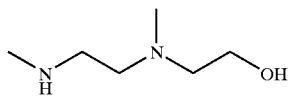 | 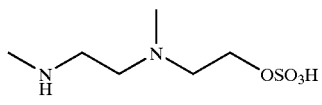 | fluorine | navy |
| 122 | " | 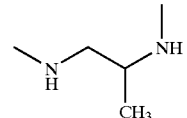 | " | navy |
| 123 | " | 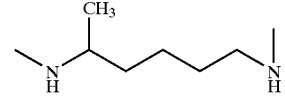 | " | navy |
| 124 | " | 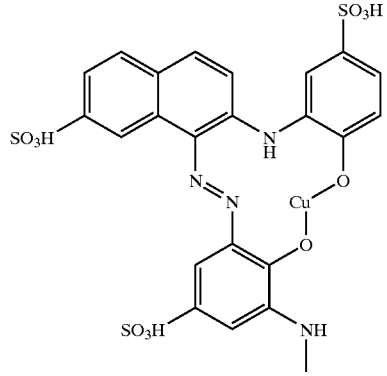 | " | navy |
| 125 | 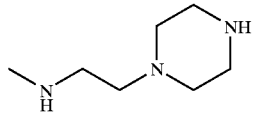 |  | " | navy |

TABLE 11-continued
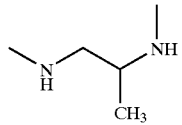
| Ex. | Fb— | —A— | Hal | Hue |
|---|---|---|---|---|
| 126 | " | 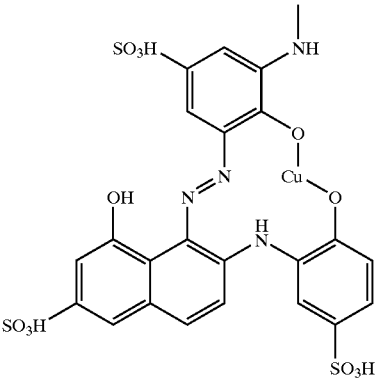 | chlorine | navy |
| 127 | 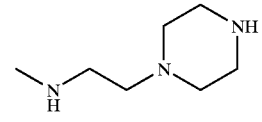 | 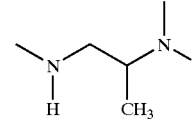 | " | navy |
| 128 | " | 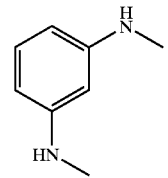 | " | navy |
| 129 | " | 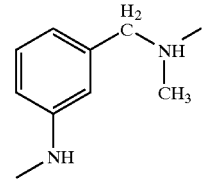 | " | navy |
| 130 | " | 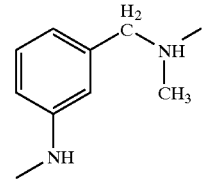 | " | navy |
| 131 | " | 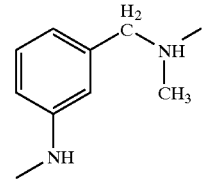 | fluorine | navy |

TABLE 11-continued
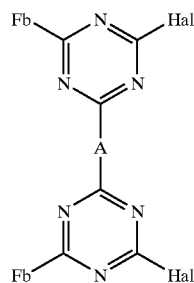
| Ex. | Fb— | —A— | Hal | Hue |
|---|---|---|---|---|
| 132 | " | (p-phenylenediamine, N,N'-dimethyl) | fluorine | navy |
| 133 | " | (biphenyl bis-sulfonic acid bis-methylamino) | chlorine | navy |
| 134 | " | (stilbene bis-sulfonic acid bis-methylamino) | fluorine | navy |
| 135 | (Cu-complex azo dye structure) | (methyl-piperazinyl ethyl methylamine) | fluorine | navy |
| 136 | " | (methyl-piperazinyl ethyl methylamine) | chlorine | navy |

TABLE 11-continued

[Structure: Fb—(triazine with Hal)—A—(triazine with Fb and Hal)]

| Ex. | Fb— | —A— | Hal | Hue |
|---|---|---|---|---|
| 137 | " | 1,4-phenylene bis(HN—) | fluorine | navy |
| 138 | " | 1,3-phenylene bis(HN—) | chlorine | navy |
| 139 | [copper complex azo dye structure with methylamino, SO₃H, OH, and SO₃H substituents on naphthalene and phenyl rings] | —NH—CH₂CH₂—N(4-methylpiperazine) | chlorine | navy |
| 140 | " | —NH—CH₂CH₂—N(4-methylpiperazine) | fluorine | navy |

TABLE 11-continued

| Ex. | Fb— | —A— | Hal | Hue |
|---|---|---|---|---|
| 141 | " | (4-position diaminobenzene, N-methyl on each) | chlorine | navy |
| 142 | " | (3-position diaminobenzene, N-methyl on each) | chlorine | navy |
| 143 | " | (3-(methylamino)-N-methylbenzylamine) | chlorine | navy |
| 144 | " | (3-(methylamino)-N-methylbenzylamine) | fluorine | navy |
| 145 | (copper complex azo dye with SO3H, OH, HN-methyl, and NH-phenyl substituents) | HOCH2CH2-NH-CH2CH2-NH(CH3), with additional N-methyl | chlorine | navy |

TABLE 11-continued

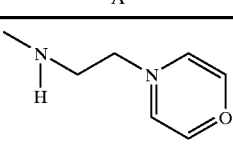

| Ex. | Fb— | —A— | Hal | Hue |
|---|---|---|---|---|
| 146 | " | 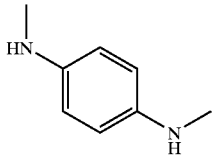 | fluorine | navy |
| 147 | " | 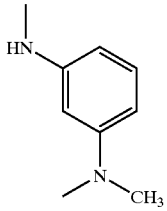 | chlorine | navy |
| 148 | " | 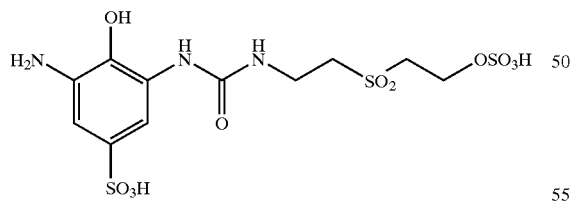 | chlorine | navy |

EXAMPLE 150

0.05 mol of a compound of the formula

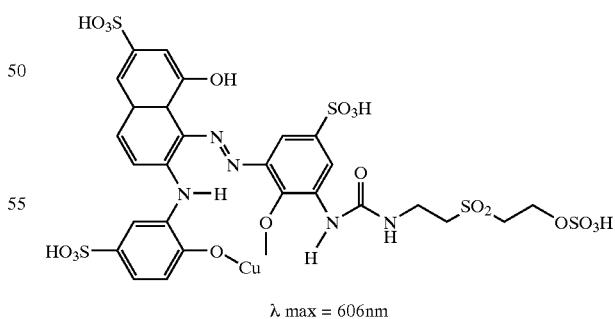

is diazotized with 12 ml of sodium nitrite solution (345 g/1000 ml) at 0–5° C. and below pH 1.5 over 1 h. Excess nitrous acid is then destroyed with amidosulfonic acid and the diazonium salt suspension is admixed with 0.05 mol of 6-(6-hydroxy-3-sulfoanilino)-4-hydroxynaphthalene-2-sulfonic acid. The coupling is carried out at a pH of 1.3–2.0 and a temperature of 35° C.

After the coupling has ended, the pH is adjusted to 5.0 at room temperature with 20% sodium carbonate solution. After addition of 14.0 g of copper sulfate pentahydrate, the pH is again adjusted to 5.0–5.5 and maintained there. After the coppering has ended, the dye of the formula (P) according to the invention

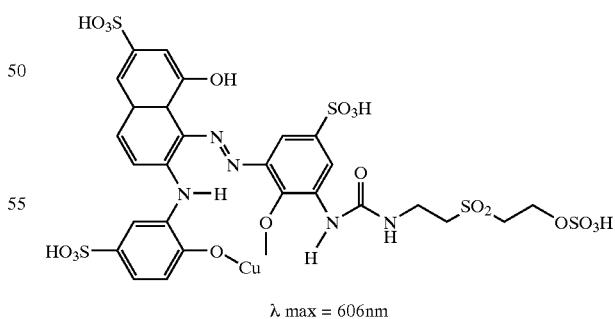

λ max = 606nm is isolated by salting out with potassium chloride. The dye dyes cotton in blue shades having good fastness properties, of which especially the good lightfastness is to be emphasized.

The examples show further correspondingly prepared dyes

| Example | Dye | Hue |
|---------|-----|-----|
| 151 | 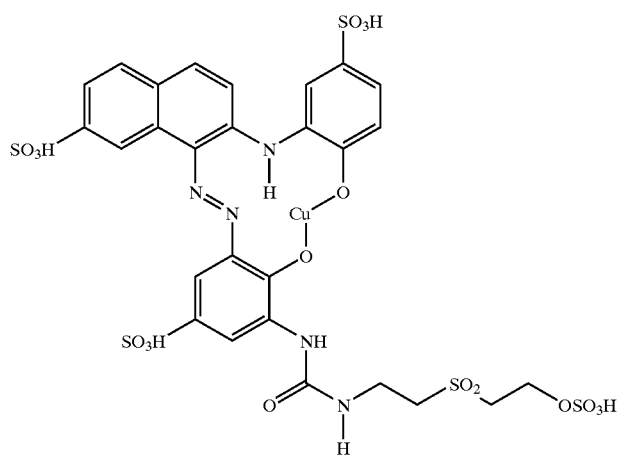 | navy |
| 152 | 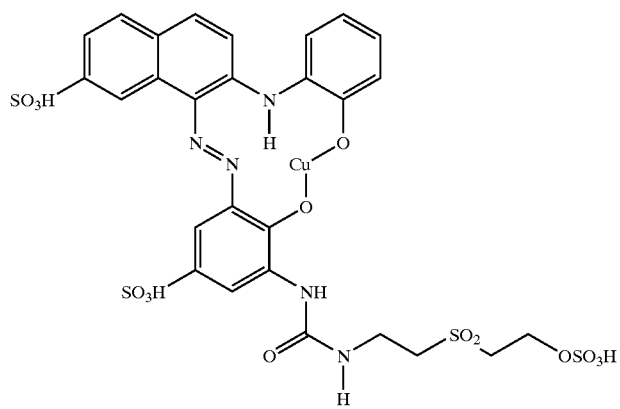 | navy |
| 153 | 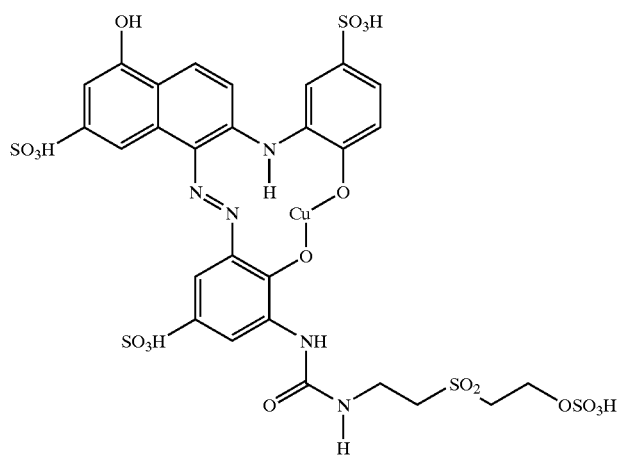 | navy |

| Example | Dye | Hue |
|---|---|---|
| 154 | 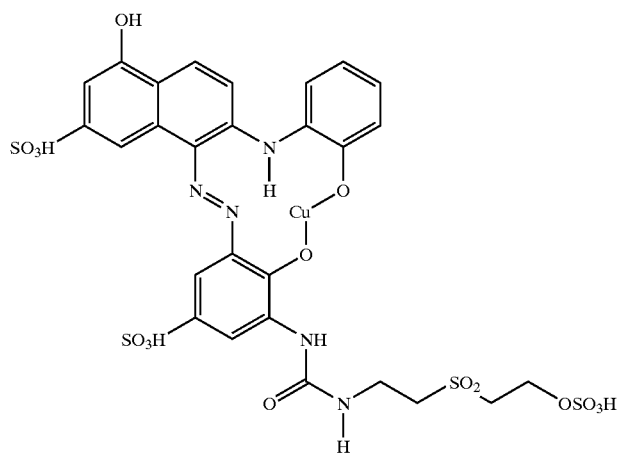 | navy |
| 155 | 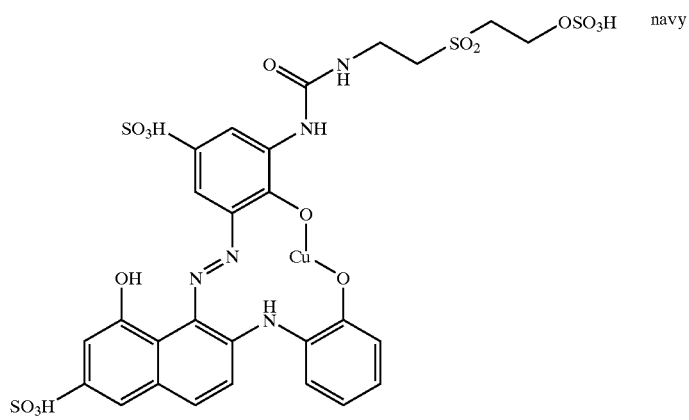 | navy |
| 156 | 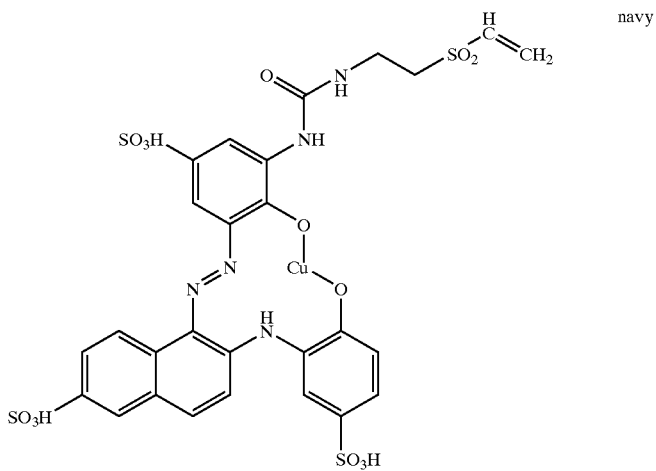 | navy |

| Example | Dye | Hue |
|---------|-----|-----|
| 157 | | navy |
| 158 | | navy |

What is claimed is:

1. Reactive copper, cobalt or chromium complex compounds of the general formula (1)

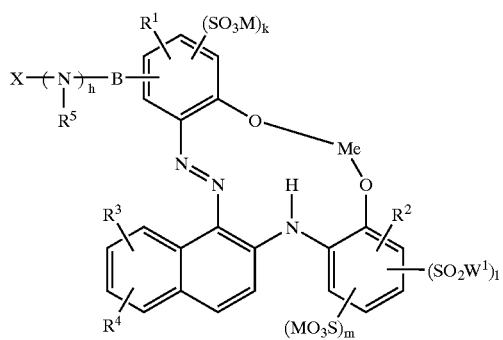

(1)

wherein

B is a direct bond or a bridge member;
X is a fiber-reactive structural element;
$W^1$ is vinyl or a group of the formula —$CH_2$—$CH_2$—V, where V is an alkali-eliminable radical;
$R^1$ and $R^2$ are independently hydrogen, chlorine, alkyl of 14 carbon atoms, alkoxy of 1–4 carbon atoms, carboxyl, sulfamoyl, hydroxyl or sulfo;
$R^3$ is hydrogen, hydroxyl, carboxyl or sulfo;
$R^4$ is hydrogen or sulfo;
$R^5$ is hydrogen, alkyl of 1 to 4 carbon atoms which can be substituted by halogen, hydroxyl, cyano, alkoxy of 1 to 4 carbon atoms, alkoxycarbonyl of 2 to 5 carbon atoms, carboxyl, sulfo or sulfato;
h, k, l and m are independently 0 or 1;
Me is copper, cobalt or chromium;
M is hydrogen, an alkali metal, or the mole equivalent of an alkaline earth metal.

2. The reactive compound as claimed in claim 1, wherein $R^1$ and $R^2$ are hydrogen, Me is copper or cobalt and M is sodium, potassium or lithium.

3. The reactive compounds as claimed in claim 1, wherein

B is a direct covalent bond, h is 0, X is a group of the general formula —$SO_2CH$=$CH_2$ or —$SO_2CH_2CH_2V$ and V is an alkali-eliminable grouping, Me is copper, cobalt or chromium.

4. The reactive compound as claimed in claim 1, wherein X is a triazinyl radical of the following formula:

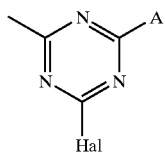

where

Hal is Cl or F and

A is the radical of an amine AH which is unsubstituted or substituted by one or two $C_1$–$C_6$ alkyl groups, which is optionally independently substituted by hydroxyl, $C_1$–$C_2$ alkoxy groups, sulfato, phenyl or hydroxycarbonyl, or a phenyl radical which is unsubstituted or substituted by one or two substituents selected from the group consisting of $C_1$–$C_2$-alkyl, $C_1$–$C_2$-alkoxy, $C_1$–$C_2$-alkoxyalkyl, $C_1$–$C_2$-alkoxyalkoxy, amino, hydroxyl, chlorine, sulfo, sulfomethyl, sulfonamide, carboxyl, carboxamide, carboxylic ester, nitrile, aminocarboxamide and oxalamino or by a naphthyl radical which is unsubstituted or substituted by one, two or three sulfo groups or is taurine, N-methyltaurine, methylaminomethane-sulfonic acid, pyrrolidine, piperidine, 1-methylpiperazine, or morpholine.

5. The reactive compound as claimed in claim 1, wherein X is a halotriazinyl radical which is optionally bonded to a second halotriazinyl radical or to a halodiazinyl radical or to one or more vinylsulfonyl or sulfatoethylsulfonyl radicals directly or via a bridge member of the formulae

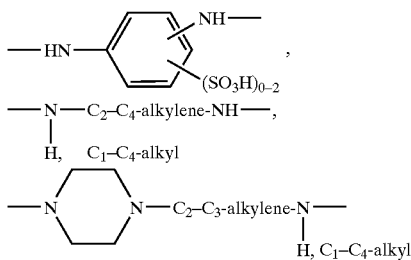

or in the case of sulfatoethylsulfonyl or vinylsulfonyl group via a bridge member

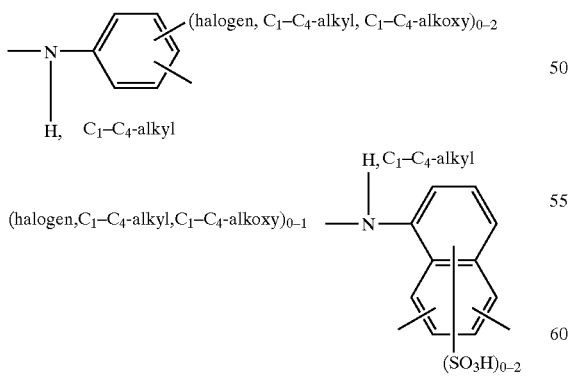

where the alkyl radicals are optionally substituted by sulfo, carboxyl, hydroxyl or sulfato radicals.

6. The reactive compound as claimed in claim 1, wherein X is

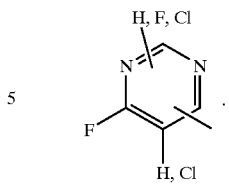

7. The reactive compound as claimed in claim 1, wherein X is a grouping of the following formula:

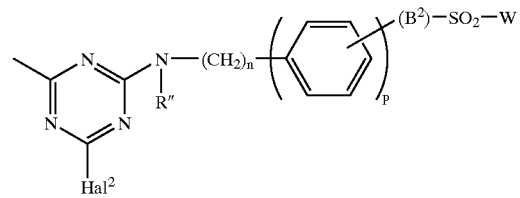

wherein

W is $W^1$;

n is from 0 to 3;

p is 0 or 1;

$B^2$ is a grouping of the formula —$(CH_2)_s$—$((CH_2)_2$—O—$(CH_2)_2)_t$;

S is from 0 to 6;

T is 0 or 1;

$Hal^2$ is Cl, F and

R" is phenyl, hydrogen or alkyl of 1 to 6 carbon atoms, which is optionally substituted, R" is phenyl and n=0; p=0; s=2 or 3; t=0 or R" is H and n=0; p=1; s=1, t=0 where the phenyl ring between

and

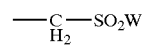

is metasubstituted, or

R" is H; n=0; p=0; s=3; t=0 or

R" is methyl; n=0; p=0; s=2; t=0 or

R" is H; n=0; p=1; s=0, t=0 where the phenylene ring between

and —$SO_2W$ is ortho-, meta- or para-substituted, or

R" is H; n=0; p=0; s=0; t=1 or

R" is H; n=2; p=0; s=0; t=0.

8. The reactive compound as claimed in claim 1, wherein X is a radical of the formula (2)

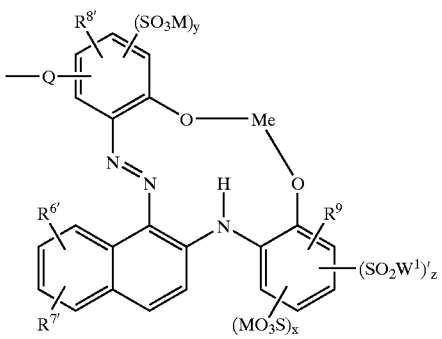

(2)

where
Q is

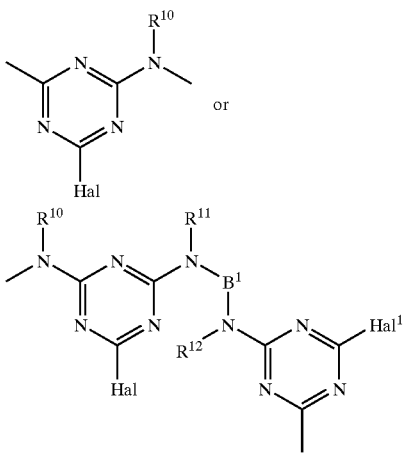

or and
$R^{6'}$ is hydrogen, hydroxyl or sulfo,
$R^{7'}$ is hydrogen or sulfo,
x, y and z are independently 0 or 1,
h is 1 and
$R^{8'}$ and $R^9$ are independently hydrogen, chlorine, alkyl of 1–4 carbon atoms, alkoxy of 1–4 carbon atoms, carboxyl, sulfamoyl or sulfo;
$R^{10}$, $R^{11}$ and $R^{12}$ are independently hydrogen, substituted or unsubstituted alkyl of 1–4 carbon atoms and
$B^1$ is a bridge member:
Hal and $Hal^1$ are independently chlorine, fluorine or a substituted or unsubstituted pyridinium radical.

9. The reactive compounds as claimed in claim 8, wherein $B^1$ is selected from the group consisting of straight-chain alkylene of 2 to 6 carbon atoms and branched alkylene of 3 to 6 carbon atoms which are each interrupted by 1 or 2 hetero groups selected from the groups of the formulae —O—, —CO—, —SO$_2$—, —NH—, —N($R^A$)—NH—CO—, —CO—NH—, —SO$_2$—NH— and —NH—SO$_2$—, phenylene, which is optionally substituted by 1 or 2 substituents selected from the group consisting of sulfo, carboxyl, methyl, ethyl, methoxy and ethoxy, which is optionally substituted by 1 or 2 substituents selected from the group consisting of sulfo, carboxyl, methyl, ethyl, methoxy and ethoxy, also the radical of 1,1-diphen-4,4'-ylene which is optionally substituted in each phenylene radical by methyl, methoxy or sulfo, or is the 1,1'-stilben-4,4'-ylene radical which is optionally substituted in every phenylene radical by methyl, methoxy or sulfo, or is cycloalkylene of 5 to 8 carbon atoms, or is a group of the general formula alk-$B^3$, $B^3$-alk, alk-$B^3$-alk or phen-G-phen, in each of which alk is alkylene of 2 to 4 carbon atoms, or is alkylene of 2 to 10 carbon atoms, which is interrupted by 1 or 2 hetero groups selected from the group consisting of —O— and —NH—, is $B^3$-phenylene, which is optionally substituted by 1 or 2 substituents selected from the group consisting of sulfo, carboxyl, methyl, ethoxy, methoxy, ethoxy, chlorine and bromine, or is cycloalkylene of 5 to 8 carbon atoms or is the bivalent radical of a saturated 5- to 8-membered heterocycle which contains two nitrogen atoms, and a carbon atom of the triazine radical, phen is a phenylene radical which is optionally substituted by 1 or 2 substituents selected from the group consisting of carboxyl, sulfo, methyl, ethyl, methoxy, ethoxy, chlorine and bromine, and G is a direct bond or a radical of the formula —CH=CH— or is cycloalkylene of 5 to 8 carbon atoms, or the group —N($R^{12}$)—$B^1$—N($R^{11}$)— is the bivalent radical of a saturated 5- to 8-membered heterocycle which contains the two nitrogen atoms and whose nitrogen atoms are bonded to a carbon atom of the triazine radical, or is N-(2-aminoethyl) piperazine; $R^A$ is hydrogen, substituted or unsubstituted alkyl or 1 to 4 carbon atoms.

10. The reactive compound as claimed in claim 1, wherein B is a group of the general formulae (a) to (m)

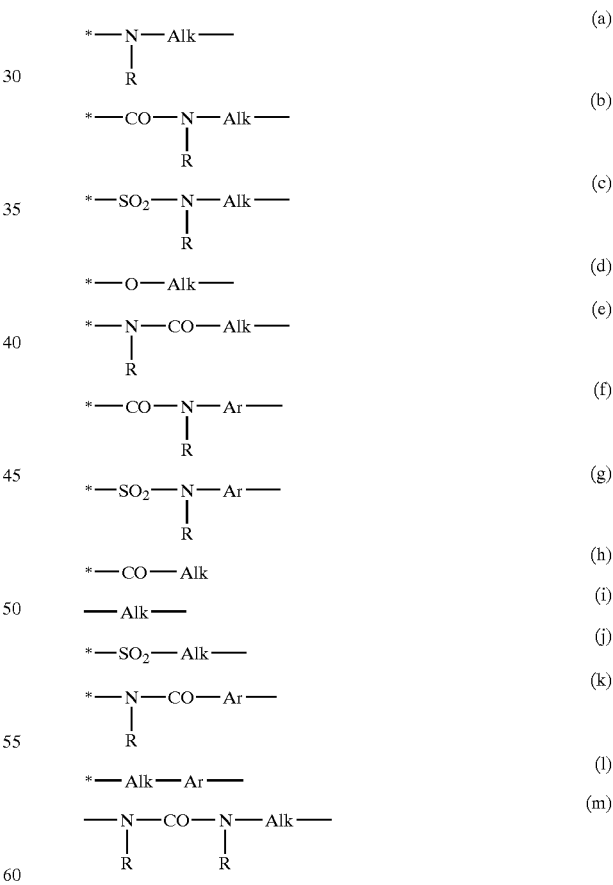

where the asterisk marks the site of attachment to the chromophore;
R is hydrogen or alkyl of 1 to 6 carbon atoms, which may be substituted by substituents selected from the group consisting of halogen, hydroxyl, carboxyl, sulfo and sulfato;

Alk is alkylene of 1 to 6 carbon atoms or alkylene of 2 to 8, which is interrupted by 1 or 2 hetero groups, or by 1 or 2 groupings containing 1, 2 or 3 hetero groups;

Ar is phenylene or naphthylene or the radical of a biphenyl or stilbene, each of which of these Ar radicals is optionally substituted, for example by substituents selected from the group consisting of fluorine, chlorine, bromine, alkyl of 1 to 4 carbon atoms, alkoxy of 1 to 4 carbon atoms, carboxyl and sulfo.

11. A reactive dye as claimed in claim 1, wherein Me is copper.

12. A process for preparing reactive compounds as claimed in claim 1, which comprises reacting compounds of the general formula (3a)

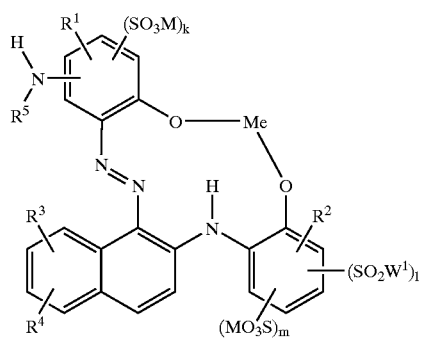

(3a)

with compounds of the general formula X-Hal, wherein

Hal is fluorine or chlorine;

X is a fiber-reactive structural element;

$W^1$ is vinyl or a group of the formula —CH$_2$—CH$_2$—V, where V is an alkali-eliminable radical;

$R^1$ and $R^2$ are independently hydrogen, chlorine, alkyl of 1–4 carbon atoms, alkoxy of 1–4 carbon atoms, carboxyl or sulfamoyl, hydrogen, hydroxyl or sulfo;

$R^3$ is hydrogen, hydroxyl, carboxyl or sulfo;

$R^4$ is hydrogen or sulfo;

$R^5$ is hydrogen, alkyl of 1 to 4 carbon atoms, which may be substituted by halogen, hydroxyl, cyano, alkoxy of 1 to 4 carbon atoms, alkoxycarbonyl of 2 to 5 carbon atoms, carboxyl, sulfo or sulfato;

k, l, m are each independently 0 or 1.

13. A process for preparing reactive dyes as claimed in claim 2, which comprises diazotizing amino compounds of the general formula (1-2)

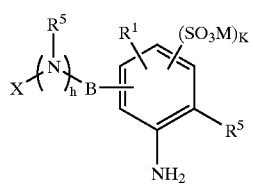

(1-2)

reacting the diazotization product with a compound of the formula (1-3)

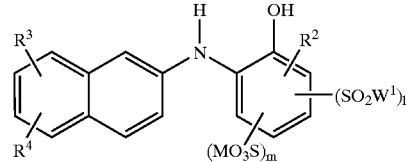

(1-3)

to obtain a compound of the general formula (1-6)

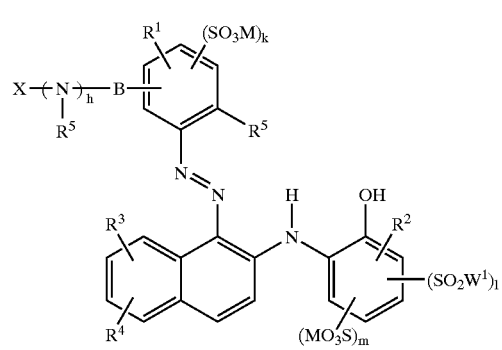

(1-6)

wherein

B is a direct bond or a bridge member;

X is a fiber-reactive structural element;

$W^1$ is vinyl or a group of the formula —CH$_2$—CH$_2$—V, where V is an alkali-eliminable radical;

$R^1$ and $R^2$ are independently hydrogen, chlorine, alkyl of 1–4 carbon atoms, alkoxy of 1–4 carbon atoms, carboxyl, sulfamoyl, hydroxyl or sulfo;

$R^3$ is hydrogen, hydroxyl, carboxyl or sulfo;

$R^4$ is hydrogen or sulfo;

$R^5$ is hydrogen, methoxy or hydroxyl and h, k, l and m are independently 0 or 1;

M is hydrogen, an alkali metal, or the mole equivalent of an alkaline earth metal, and subsequently treating this compound with a copper, cobalt or chromium donor.

14. A process for preparing reactive dyes as claimed in claim 8, which comprises reacting amino compounds of the general formula (3a) and (3b) and also (4)

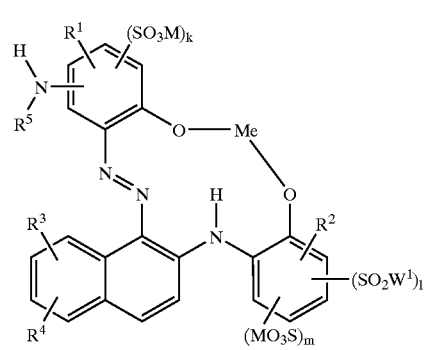

(3a)

-continued (3b)

(6)

where $R^{11}$, $R^{12}$, $B^1$ are each as defined above.

15. A compound of formula (1-6)

(1-6)

wherein
- B is a direct bond or a bridge member;
- X is a fiber-reactive structural element;
- $W^1$ is vinyl or a group of the formula —$CH_2$—$CH_2$—V, where V is an alkali-eliminable radical;
- $R^1$ and $R^2$ are independently hydrogen, chlorine, alkyl of 1–4 carbon atoms, alkoxy of 1–4 carbon atoms, carboxyl, sulfamoyl, hydroxyl or sulfo;
- $R^3$ is hydrogen, hydroxyl, carboxyl or sulfo;
- $R^4$ is hydrogen or sulfo;
- $R^5$ is hydrogen, alkyl of 1 to 4 carbon atoms which can be substituted by halogen, hydroxyl, cyano, alkoxy of 1 to 4 carbon atoms, alkoxycarbonyl of 2 to 5 carbon atoms, carboxyl, sulfo or sulfato;
- h, k, l and m are independently 0 or 1;
- M is hydrogen, an alkali metal, or the mole equivalent of an alkaline earth metal.

16. A compound of the formula (3)

(3)

wherein
- B is a direct bond or a bridge member;
- $W^1$ is vinyl or a group of the formula —$CH_2$—$CH_2$—V, where V is an alkali-eliminable radical;
- $R^1$ and $R^2$ are independently hydrogen, chlorine, alkyl of 1–4 carbon atoms, alkoxy of 1–4 carbon atoms, carboxyl, sulfamoyl, hydroxyl or sulfo;

(4)

wherein
- $W^1$ is vinyl or a group of the formula —$CH_2$—$CH_2$—V, where V is an alkali-eliminable radical;
- $R^1$ and $R^2$ are independently hydrogen, chlorine, alkyl of 1–4 carbon atoms, alkoxy 1–4 carbon atoms, carboxyl, sulfamoyl, hydroxyl or sulfo;
- $R^3$ is hydrogen, hydroxyl, carboxyl or sulfo;
- $R^4$ is hydrogen or sulfo;
- $R^5$ is hydrogen, alkyl of 1 to 4 carbon atoms which can be substituted by halogen, hydroxyl, cyano, alkoxy of 1 to 4 carbon atoms, alkoxycarbonyl of 2 to 5 carbon atoms, carboxyl, sulfo or sulfato;
- $R^6$ is hydrogen, hydroxyl or sulfo,
- $R^7$ is hydrogen or sulfo,
- $R^8$ and $R^9$ are independently hydrogen, chlorine, alkyl of 1–4 carbon atoms, alkoxy of 1–4 carbon atoms, carboxyl, sulfamoyl or sulfo;
- $R^{10}$, $R^{11}$ and $R^{12}$ are independently hydrogen, substituted or unsubstituted alkyl of 1–4 carbon atoms
- k, l and m are independently 0 or 1;
- Me is copper, cobalt or chromium;
- M is hydrogen, an alkali metal, or the mole equivalent of an alkaline earth metal;
- x, y and z are independently 0 or 1,
- h is 1 and
- $B^1$ is a bridge member,
- Hal is Cl or F with each other or first reacting a compound of the general formula (3a) with a compound of the general formula (5)

(5)

and a compound of the general formula (3b) with a compound of the general formula (5), and the compounds thus obtained are subsequently reacted with each other with the stoichiometric amount of compound (6)

$R^3$ is hydrogen, hydroxyl, carboxyl or sulfo;

$R^4$ is hydrogen or sulfo;

$R^5$ is hydrogen, alkyl of 1 to 4 carbon atoms which can be substituted by halogen, hydroxyl, cyano, alkoxy of 1 to 4 carbon atoms, alkoxycarbonyl of 2 to 5 carbon atoms, carboxyl, sulfo or sulfato;

h, k, l and m are independently 0 or 1;

Me is copper, cobalt or chromium;

M is hydrogen, an alkali metal, or the mole equivalent of an alkaline earth metal.

17. A process for preparing compounds of the general formula (3) starting from amino compounds of the general formula (8a) or (8b)

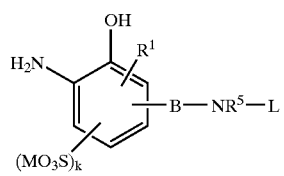
(8a)

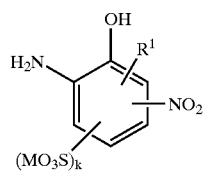
(8b)

wherein

L is a hydrolyzable protecting group and

B is a direct bond or a bridge member;

$R^1$ is hydrogen, chlorine, alkyl of 1–4 carbon atoms, alkoxy of 1–4 carbon atoms, carboxyl, sulfamoyl, hydroxyl or sulfo;

$R^5$ is hydrogen, alkyl of 1 to 4 carbon atoms which can be substituted by halogen, hydroxyl, cyano, alkoxy of 1 to 4 carbon atoms, alkoxycarbonyl of 2 to 5 carbon atoms, carboxyl, sulfo or sulfato;

K is 0 or 1;

M is hydrogen, an alkali metal, or the mole equivalent of an alkaline earth metal, by diazotization and coupling onto a compound of the formula (1-3)

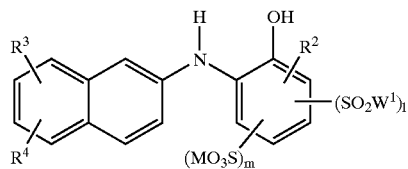
(1-3)

wherein $W^1$ is vinyl or a group of the formula —$CH_2$—$CH_2$—V, where V is an alkali-eliminable radical;

$R^2$ is hydrogen, chlorine, alkyl of 1–4 carbon atoms, alkoxy of 1–4 carbon atoms, carboxyl, sulfamoyl, hydroxyl or sulfo;

$R^3$ is hydrogen, hydroxyl, carboxyl or sulfo;

$R^4$ is hydrogen or sulfo;

l and m are independently 0 or 1;

and subsequent reaction with copper, cobalt or chromium donors and subsequent hydrolysis of the protected amino group, or reduction of the nitro group.

18. A process for dyeing hydroxyl- and/or carboxamido-containing material, which comprises applying the compound as claimed in claim 1 to the material and fixing the dye on the material by means (a) Of heat (b) With aid of an alkaline agent or (c) Of heat and with the aid of an alkaline agent.

19. The reactive compound as claimed in claim 7, wherein

R" is phenyl, hydrogen or alkyl of 1 to 2 carbon atoms, which is optionally substituted with substituents selected from the group consisting of halogen, hydroxyl, carboxyl, sulfo and sulfato.

20. The reactive compound as claimed in claim 7, wherein $B^1$ is 1,2-ethylene, 1,3-propylene, 1,4-butylene, 1,2-propylene, 1,3-butylene, straight-chain alkylene of 2 to 6 carbon atoms and branched alkylene of 3 to 6 carbon atoms which are each interrupted by 1 or 2 hetero groups selected from the groups of the formulae —O—, —CO—, —$SO_2$—, —NH—, —N($R^A$)—, —NH—CO—, —CO—NH—, —$SO_2$—NH— and —NH—$SO_2$—, phenylene, which is optionally substituted by 1 or 2 substituents selected from the group consisting of sulfo, carboxyl, methyl, ethyl, methoxy and ethoxy, or benzylidene, which is optionally substituted by 1 or 2 substituents selected from the group consisting of sulfo, carboxyl, methyl, ethyl, methoxy and ethoxy, also the radical of 11-diphen-4,4'-ylene which is optionally substituted in each phenylene radical by methyl, methoxy or sulfo, or is the 1,1'-stilben-4,4'-ylene radical which is optionally substituted in every phenylene radical by methyl, methoxy or sulfo, or is cycloalkylene of 5 to 8 carbon atoms, or is a group of the general formula alk-$B^3$, $B^3$-alk, alk-$B^3$-alk or phen-G-phen, in each of which alk is alkylene of 2 to 4 carbon atoms, or is alkylene of 2 to 10 carbon atoms, which is interrupted by 1 or 2 hetero groups selected from the group consisting of —O— and —NH—, is $B^3$-phenylene, which is optionally substituted by 1 or 2 substituents selected from the group consisting of sulfo, carboxyl, methyl, ethoxy, methoxy, ethoxy, chlorine and bromine, or is cycloalkylene of 5 to 8 carbon atoms or is the bivalent radical of a saturated 5- to 8-membered heterocycle which contains two nitrogen atoms, phen is a phenylene radical which is optionally substituted by 1 or 2 substituents selected from the group consisting of carboxyl, sulfo, methyl, ethyl, methoxy, ethoxy, chlorine and bromine, and G is a direct bond or a radical of the formula —CH=CH— or is cycloalkylene of 5 to 8 carbon atoms, or the group —N($R^{12}$)—$B^1$—N($R^{11}$)— is the bivalent radical of a saturated 5- to 8-membered heterocycle which contains the two nitrogen atoms and whose nitrogen atoms are bonded to a carbon atom of the triazine radical, or is N-(2-aminoethyl)piperazine;

$R^A$ is hydrogen, substituted or unsubstituted alkyl having 1 to 4 carbon atoms.

21. The reactive compound as claimed in claim 1, wherein R is hydrogen or alkyl of 1 to 2 carbon atoms which is optionally substituted by substituents selected from the group consisting of halogen, hydroxyl, carboxyl, sulfo and sulfato.

* * * * *

UNITED STATES PATENT AND TRADEMARK OFFICE
CERTIFICATE OF CORRECTION

PATENT NO.    : 6,809,187 B2
DATED         : October 26, 2004
INVENTOR(S)   : Stefan Ehrenberg et al.

It is certified that error appears in the above-identified patent and that said Letters Patent is hereby corrected as shown below:

Title page,
Item [73], Assignee, "Oystar Textil Farben GmbH & Co." should read -- DyStar Textilfarben GmbH & Co. --.

Column 67,
Line 66, "14" should read -- 1-4 --.

Signed and Sealed this

First Day of February, 2005

JON W. DUDAS
*Director of the United States Patent and Trademark Office*